(12) United States Patent
Aoyagi et al.

(10) Patent No.: US 11,260,673 B2
(45) Date of Patent: Mar. 1, 2022

(54) PRINTING APPARATUS AND PRINTING METHOD

(71) Applicant: CANON KABUSHIKI KAISHA, Tokyo (JP)

(72) Inventors: Takaaki Aoyagi, Kawasaki (JP); Koya Iwakura, Kawasaki (JP); Shimpei Fujisaki, Tokyo (JP); Yasuhiro Ota, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 16/516,476

(22) Filed: Jul. 19, 2019

(65) Prior Publication Data

US 2020/0039241 A1 Feb. 6, 2020

(30) Foreign Application Priority Data

Aug. 1, 2018 (JP) .............................. JP2018-145064

(51) Int. Cl.
*B41J 3/407* (2006.01)
*H04N 1/00* (2006.01)
*H04N 1/047* (2006.01)

(52) U.S. Cl.
CPC ........ *B41J 3/4071* (2013.01); *H04N 1/00037* (2013.01); *H04N 1/00076* (2013.01); *H04N 1/047* (2013.01); *H04N 2201/04737* (2013.01)

(58) Field of Classification Search
CPC ... B41J 3/4071; B41J 3/14; B41J 11/42; B41J 13/10; B41P 2217/55
See application file for complete search history.

(56) References Cited

U.S. PATENT DOCUMENTS 6,332,680 B1 * 12/2001 Ozawa ....................... B41J 2/01
347/104
6,612,762 B1 * 9/2003 Sakurai .................. B41J 3/4071
101/35

(Continued)

FOREIGN PATENT DOCUMENTS

JP 2004-009699 A 1/2004

OTHER PUBLICATIONS

Shimpei Fujisaki et al., U.S. Appl. No. 16/515,500, filed Jul. 18, 2019.

(Continued)

*Primary Examiner* — John Zimmermann
(74) *Attorney, Agent, or Firm* — Venable LLP

(57) ABSTRACT

A printing apparatus includes a print unit configured to perform printing on the print medium held by a holding unit, the holding unit being capable of holding multiple types of print medium, a detecting unit capable of detecting the print medium and the holding unit, and a movement unit capable of relatively moving the detecting unit and the holding unit in a first direction and in a second direction intersecting the first direction. In addition, a control unit controls the detecting unit and the movement unit in a case where a first print medium is held by the holding unit, to obtain position information of the first print medium before the print unit performs printing and, in a case where a second print medium different from the first print medium is held by the holding unit, not to obtain position information of the second print medium.

16 Claims, 26 Drawing Sheets

(56) References Cited

U.S. PATENT DOCUMENTS

| | | | | |
|---|---|---|---|---|
| 6,760,052 B2* | 7/2004 | Cummins | ............... | B41J 3/4071 347/171 |
| 6,871,949 B2* | 3/2005 | Nakano | ................. | B41J 3/4071 347/104 |
| 7,101,096 B2* | 9/2006 | Sasai | .......................... | B41J 2/01 347/104 |
| 7,651,087 B2* | 1/2010 | Miyashita | ............... | B41J 3/4071 271/163 |
| 8,649,894 B2* | 2/2014 | Hattori | .................. | H01L 21/681 700/114 |
| 2002/0067940 A1 | 6/2002 | Sasai et al. | | |
| 2004/0036756 A1 | 2/2004 | Nakano et al. | | |
| 2004/0141787 A1* | 7/2004 | Inokuchi | ................ | B41J 3/4071 400/582 |
| 2004/0141791 A1 | 7/2004 | Ohara | | |
| 2005/0225594 A1* | 10/2005 | Isono | ................... | B41J 13/0027 347/37 |
| 2006/0170750 A1* | 8/2006 | Takeshita | ................ | B41J 3/4071 347/104 |
| 2006/0181566 A1* | 8/2006 | Miyashita | ................. | B41J 13/14 347/20 |
| 2007/0040887 A1 | 2/2007 | Miyashita et al. | | |
| 2008/0273433 A1* | 11/2008 | Nishioka | ................. | G11B 17/08 369/53.15 |
| 2009/0044208 A1 | 2/2009 | Oki et al. | | |
| 2009/0262609 A1* | 10/2009 | Ebina | ................... | G11B 17/225 369/30.45 |
| 2010/0150580 A1* | 6/2010 | Brumbaugh | ............. | B41J 29/02 399/16 |
| 2013/0170735 A1* | 7/2013 | Abe | .......................... | G06T 7/70 382/151 |

OTHER PUBLICATIONS

Chinese Office Action dated Jan. 18, 2021, in related Chinese Patent Application No. 20190705970.4 (with English translation).

* cited by examiner

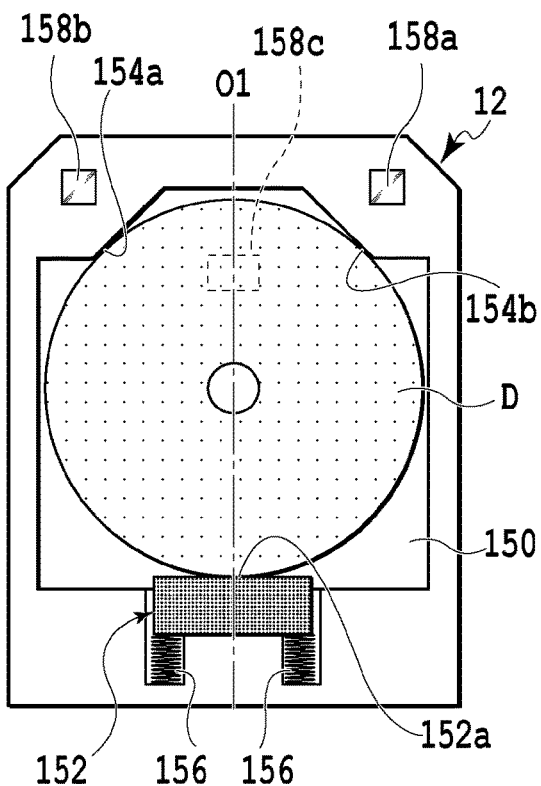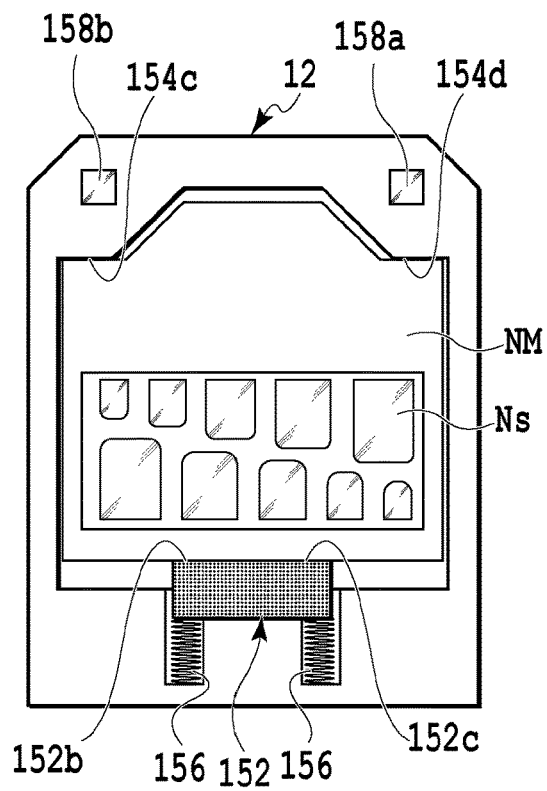
FIG.4A  FIG.4B
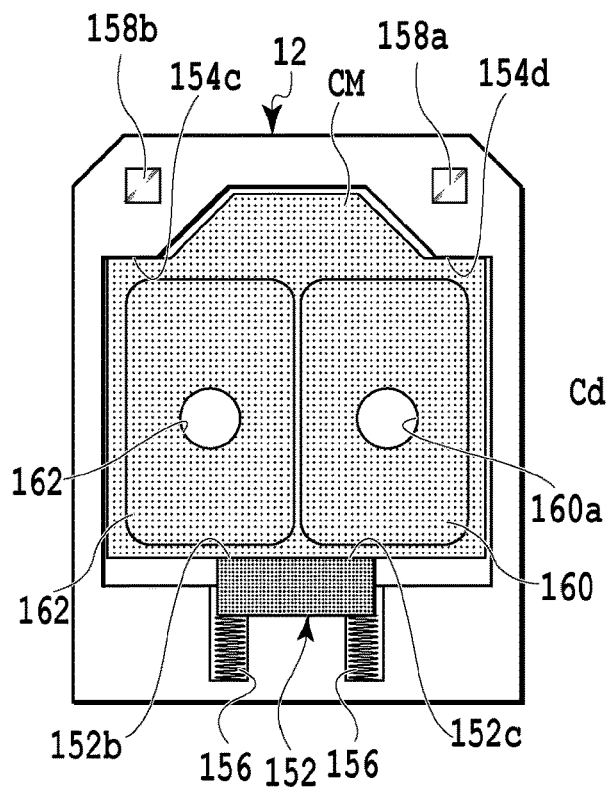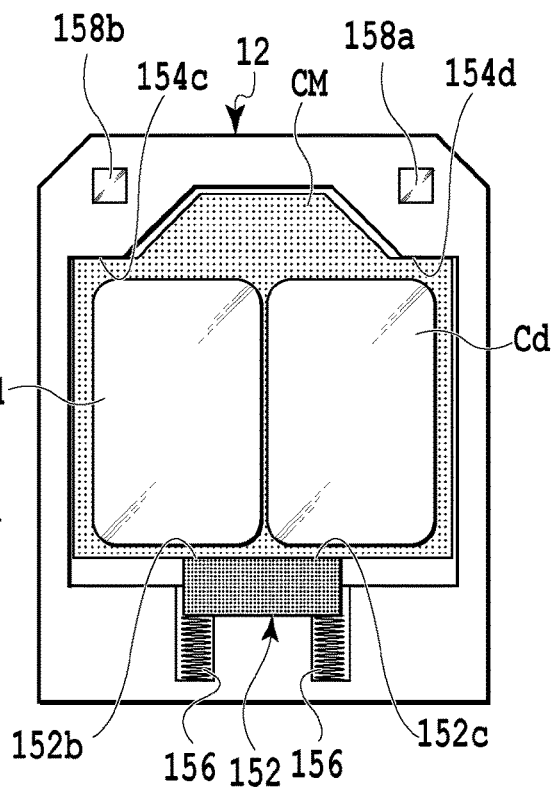
FIG.4C  FIG.4D

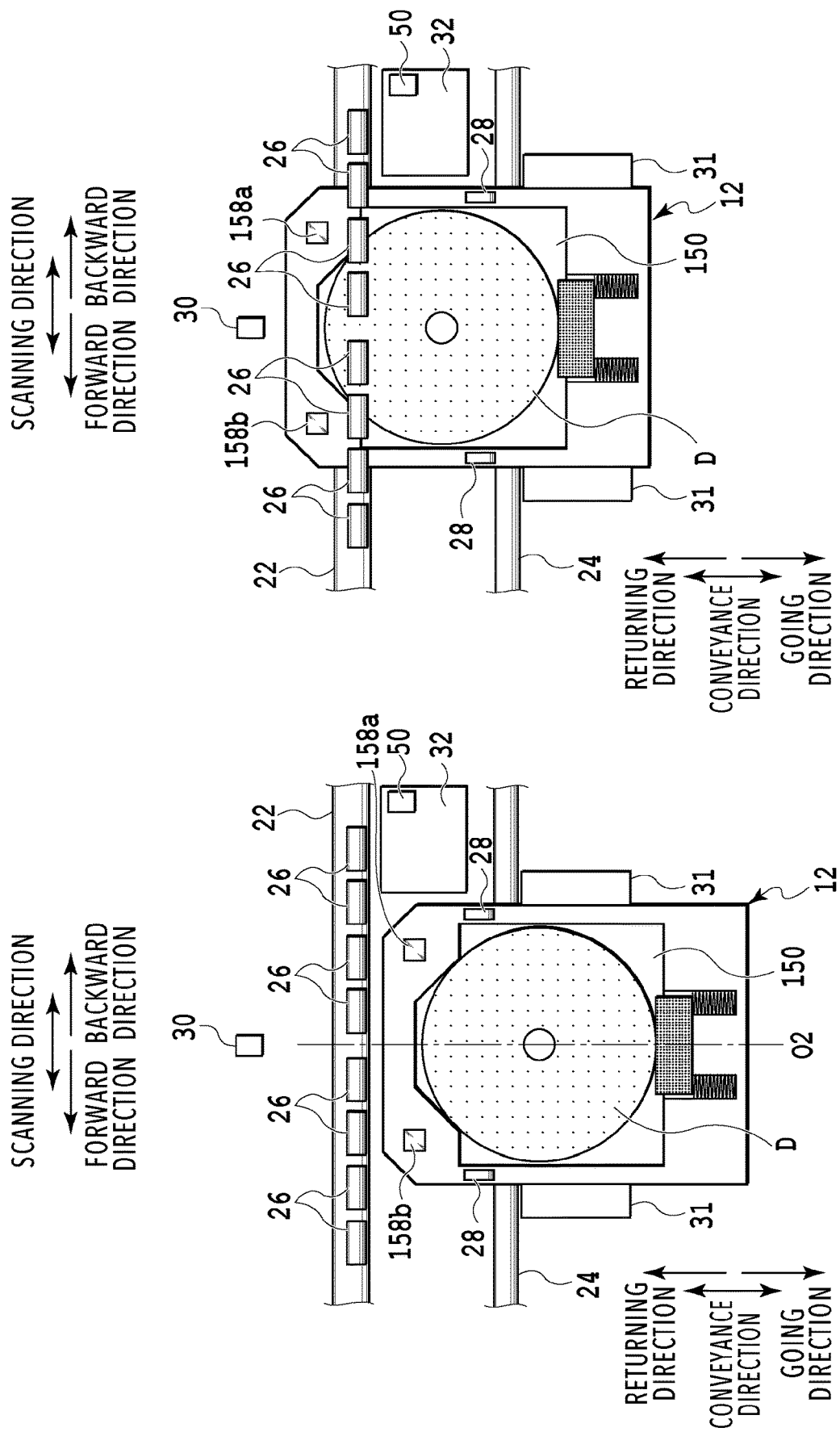

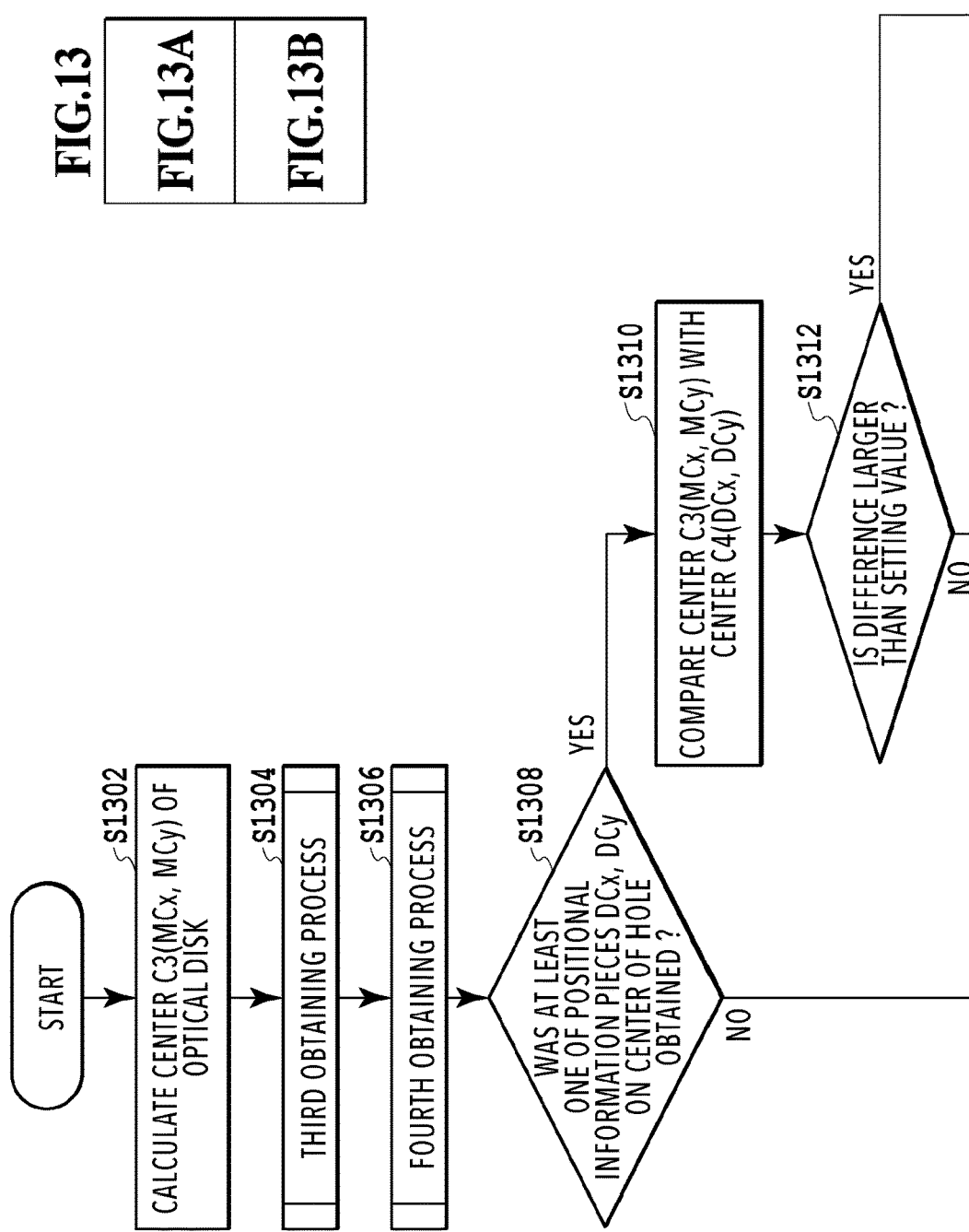

PRINTING APPARATUS AND PRINTING METHOD

BACKGROUND OF THE INVENTION

Field of the Invention

The present invention relates to printing apparatuses and printing methods for performing printing on print media held by trays.

Description of the Related Art

Japanese Patent Laid-Open No. 2004-9699 discloses a technique in which a tray is adapted to hold multiple print media, the position of each print medium is obtained based on reflectors disposed on the tray, and the print positions are determined based on the obtained positions. In this Japanese Patent Laid-Open No. 2004-9699, the position of each held print medium is obtained based on the reflector corresponding to each recess holding the print medium, regardless of the type of print medium. In other words, the position of each print medium is obtained by the same method.

Unfortunately, different types of print media require different accuracies in the print position. In other words, the permissible range of a positional error in printing, which is a distance from the position at which a print image is to be printed, is different depending on the type of print medium. Thus, in a technique disclosed in Japanese Patent Laid-Open No. 2004-9699, in the case of holding, at the same time, print media that require different permissible ranges of a positional error in printing, the accuracy in a print position obtained for one of the print media may be insufficient, causing a positional error in printing. In another case, the print position of one of the print media may be obtained with accuracy higher than necessary, and this may decrease the throughput.

SUMMARY OF THE INVENTION

The present invention has been made in light of the above problems, and an object thereof is to provide a printing apparatus and printing method capable of obtaining positional information for determining a print position according to the type of print medium.

In the first aspect of the present invention, there is provided a printing apparatus comprising:

a holding unit capable of holding a print medium of multiple types;

a print unit configured to perform printing on the print medium held by the holding unit;

a detecting unit capable of detecting the print medium and the holding unit;

a movement unit capable of moving the detecting unit relative to the print medium and the holding unit in a first direction and in a second direction intersecting the first direction;

a determining unit configured to determine a process to execute to obtain information on the position of the print medium depending on the type of the print medium;

an obtaining unit configured to obtain the information on the position of the print medium by changing the relative position of the detecting unit with respect to the holding unit by means of the movement unit based on the process determined by the determining unit; and a setting unit configured to set a print position for the print medium based on the information obtained by the obtaining unit.

In the second aspect of the present invention, there is provided a printing method of performing printing on a print medium using a printing apparatus including a print unit configured to perform printing on a print medium held by a holding unit, and a detecting unit capable of detecting the print medium and the holding unit by moving relative to the print medium and the holding unit in a first direction and in a second direction intersecting the first direction, the printing method comprising:

determining a process to execute to obtain information on the position of the print medium depending on the type of the print medium;

obtaining the information on the position of the print medium by changing the relative position of the detecting unit with respect to the print medium and the holding unit based on the process determined by the determining, and setting a print position for the print medium based on the information obtained by the obtaining.

The present invention makes it possible to obtain positional information for determining a print position according to the type of print medium.

Further features of the present invention will become apparent from the following description of exemplary embodiments with reference to the attached drawings.

BRIEF DESCRIPTION OF THE DRAWINGS

FIGS. 4A, 4B, 4C and 4D are diagrams each illustrating a tray holding a print medium;

FIGS. 5A and 5B are diagrams for explaining conveyance of the tray by a conveying part;

FIG. 13 is a diagram showing a relation between FIG. 13A and FIG. 13B;

FIGS. 13A and 13B are flowcharts illustrating the process routine of a first setting process;

DESCRIPTION OF THE EMBODIMENTS

Figure 1:
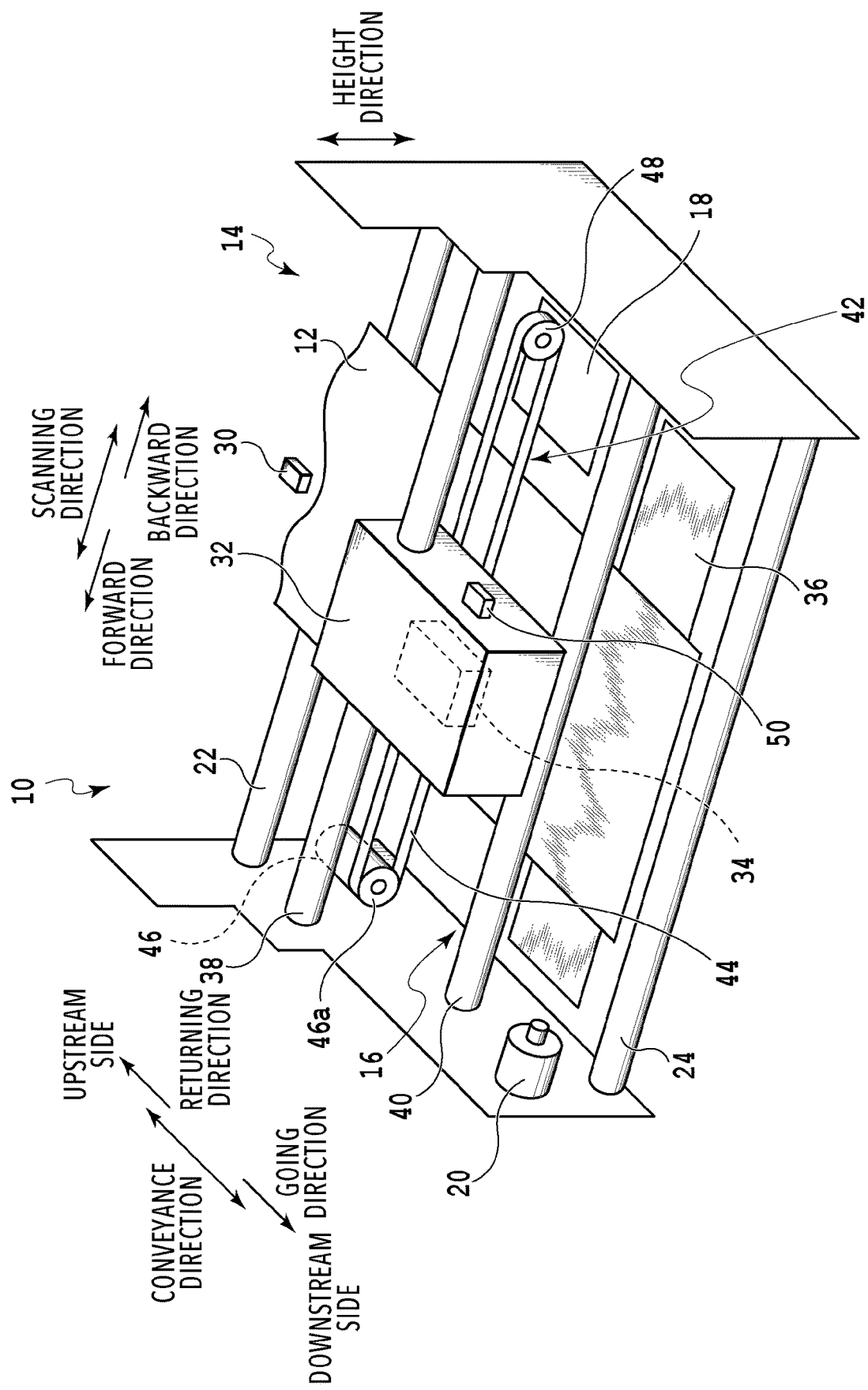
FIG. 1 is a perspective diagram illustrating a schematic configuration of a printing apparatus according to the present invention.

Hereinafter, an example of a printing apparatus and printing method according to the present invention will be described in detail with reference to the attached drawings. FIG. 1 is a perspective diagram of a schematic configuration of a printing apparatus according to the present invention. The printing apparatus 10 illustrated in FIG. 1 has a configuration in which a tray 12 holds a print medium, such as an optical disk, and the tray 12 is conveyed in a direction intersecting the scanning direction of a print head 34 to perform printing on the print medium. The printing apparatus 10 includes a conveying part 14 that conveys the tray 12, a print part 16 that ejects ink to the print medium held by the tray 12 to perform printing, and a recovery part 18 for maintaining and recovering the ink ejection performance of the print part 16.

The conveying part 14 (conveying unit) includes a first conveying roller 22 and second conveying roller 24 driven by a conveying motor 20. The first conveying roller 22 and the second conveying roller 24 are in parallel with each other with a space in between. The first conveying roller 22 is on one side of the print part 16 in the conveyance direction in which the tray 12 is conveyed. The second conveying roller 24 is on the other side of the print part 16 in the conveyance direction. Note that in the following description, the one side of the conveyance direction is referred to as the "upstream side", and the other side of the conveyance direction is referred to as the "downstream side", as appropriate.

In the conveying part 14, first driven rollers 26 (see FIG. 5A) are in pressure contact with the first conveying roller 22 and driven by the first conveying roller 22. The first conveying roller 22, together with the first driven rollers 26, nips the tray 12 and conveys the tray 12 in the conveyance direction. In addition, second driven rollers 28 (see FIG. 5A) are in pressure contact with the second conveying roller 24 and driven by the second conveying roller 24. The second conveying roller 24, together with the second driven rollers 28, nips the tray 12 and conveys the tray 12 in the conveyance direction.

The conveying part 14 also has an edge sensor 30 for detecting the tray, located upstream of the first conveying roller 22 in the conveyance direction. The edge sensor 30 is, for example, an optical sensor. The conveying part 14 has tray guides 31 (see FIG. 5A) that guide the tray 12 being conveyed, while restricting the movement of the tray 12 in the scanning direction. The conveying part 14 has a rotary encoder 132 (see FIG. 2) that rotates in synchronization with the rotation of the first conveying roller 22. The detection result of this rotary encoder 132 is used to detect the conveyance distance and conveyance speed of the tray 12. Thus, in the present embodiment, the position of the tray 12 in the conveyance direction can be detected by the rotary encoder 132.

The print part 16 (print unit) includes a carriage 32 that moves in a direction intersecting (in the present embodiment, orthogonal to) the conveyance direction and the print head 34 that is mounted on the carriage 32 and ejects ink to perform printing on a print medium held by the tray 12 being conveyed in the conveyance direction. The print part 16 also includes a platen 36 at a position facing the ejecting port surface of the print head 34 where ejecting ports for ejecting ink are formed. Note that the platen 36 and the ejecting port surface are a certain space apart. In summary, the present embodiment has a configuration in which the print part 16 performs printing on a print medium by an inkjet method.

The carriage 32 is slidably disposed on guide members 38 and 40 that are disposed with a space in between and extend in a direction intersecting the conveyance direction, and the carriage 32 is movable in this direction by being driven by a movement mechanism 42. Note that in the following description, the direction in which the carriage 32 moves, in other words, the direction intersecting the conveyance direction is referred to as the "scanning direction" as appropriate. Thus, the print head 34 disposed on the carriage 32 is movable in the scanning direction via the carriage 32.

The movement mechanism 42 includes a belt 44 which is fixed to the carriage 32 and a driving motor 46 for driving the belt 44. The driving motor 46 is disposed on one edge side of the guide member 38, and a pulley 46a is provided to the rotary shaft of the driving motor 46. The belt 44 is put between the pulley 46a and an idler pulley 48 disposed on the other edge side of the guide member 38 in a tensioned state. The belt 44 is in parallel with the guide member 38. Thus, driving of the driving motor 46 rotates the belt 44, and the rotation of the belt 44 moves the carriage 32 in the forward direction which is the direction from the other side toward the one side of the scanning direction and in the backward direction which is the direction from the one side toward the other side.

In other words, in the present embodiment, the conveying part 14 and the carriage 32 function as a movement unit which is capable of moving an optical sensor 50 (described later) relative to the tray 12 (print medium) in the conveyance direction and in the scanning direction.

The carriage 32 is arranged such that the ejecting port surface of the print head 34 is approximately in parallel with the platen 36. The carriage 32 has the optical sensor 50 (detecting unit). Thus, the optical sensor 50 is movable in the scanning direction via the carriage 32. The optical sensor 50 is capable of emitting light to the tray 12 being conveyed over the platen 36 by the conveying part 14 and a print medium held by the tray 12 and receiving the reflection light of the emitted light to detect change in the amount of the received light. Although illustration is omitted, the carriage 32 is also movable in the height direction orthogonal to the conveyance direction and the scanning direction (movable up and down).

The print part 16 has a linear encoder 134 (see FIG. 2) capable of detecting the moving distance and moving speed of the carriage 32 in the scanning direction. Thus, in the present embodiment, the position of the carriage 32 (the print head 34, the optical sensor 50) in the scanning direction can be detected by this linear encoder 134.

The recovery part 18 is disposed in a non-printing area which is on the other side in the scanning direction. The recovery part 18 includes, for example, a cap (not illustrated) for protecting the ejecting port surface of the print head 34 and a wiper (not illustrated) for removing foreign objects and ink attached to the ejecting port surface.

Figure 2:
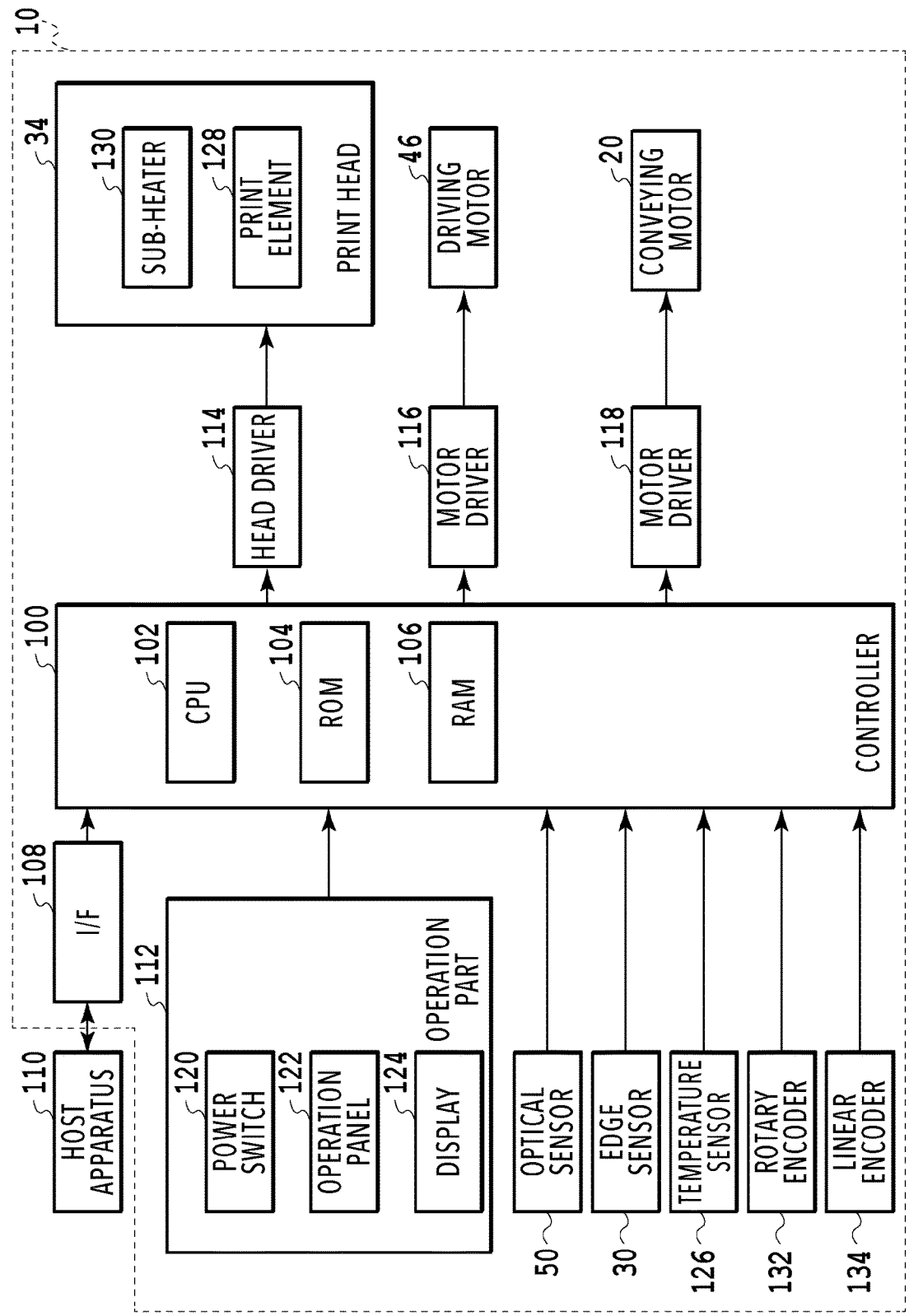
FIG. 2 is a block diagram illustrating the configuration of a control system of the printing apparatus in FIG. 1.

FIG. 2 is a block diagram illustrating the configuration of the control system of the printing apparatus 10. The entire operation of the printing apparatus 10 is controlled by a controller 100. The controller 100 includes a central processing unit (CPU) 102 that executes various control processes, such as printing operation and recovery operation. The controller 100 includes ROM 104 storing programs, tables and various fixed data for the CPU102 executing overall operation and various processes. The controller 100 also includes RAM106 as a working area in which various registers or the like necessary when the CPU102 executes programs are set.

The controller 100 is connected to a host apparatus 110 via an interface (I/F) 108. The host apparatus 110 is a supply source of image data, and examples of which include a personal computer that generates and processes image data, a scanner apparatus for reading images, and a digital camera. The host apparatus 110 and the controller 100 transmit and receive image data, various commands, status signals, and the like to and from each other.

The controller 100 is connected to an operation part 112 that users can operate, various sensors, and a head driver 114 that controls the print head 34. The controller 100 is also connected to a motor driver 116 that controls driving of the driving motor 46 and a motor driver 118 that controls driving of the conveying motor 20.

The operation part 112 includes a power switch 120 for starting up the printing apparatus 10 and an operation panel 122 for inputting the user's instructions, such as instructions for maintenance operation for the print head 34 and various kinds of printing operations. The operation part 112 also includes a display 124 that displays the contents of various errors if they occur in the printing apparatus 10.

The various sensors include the optical sensor 50 for detecting reflecting portions 158 of the tray 12 and the hole (described later) of an optical disk held by the tray 12. The various sensors also include the edge sensor 30 that detects an edge of the tray 12 being conveyed and temperature sensors 126 disposed at various places for detecting temperature. The various sensors further include the rotary encoder 132 for detecting the conveyance distance and the like of the tray 12 and the linear encoder 134 for detecting the moving distance and the like of the carriage 32.

The head driver 114 controls driving of print elements 128 for ejecting ink from ejecting ports according to print data or the like and driving of a sub-heater 130 that adjusts the temperature of the print head 34. The sub-heater 130 is a mechanism for stabilizing the ink ejection performance of the print head 34.

The controller 100, as described later, functions as an obtaining unit that obtains information on the positions of the centers of the reflecting portions 158, the center of the hole DH, an intersection point Q3, and the like while controlling the conveying part 14 and the carriage 32. The controller 100, as described later, further functions as a setting unit that sets the print position where printing onto a print medium is started, based on the obtained positional information.

Figure 3:
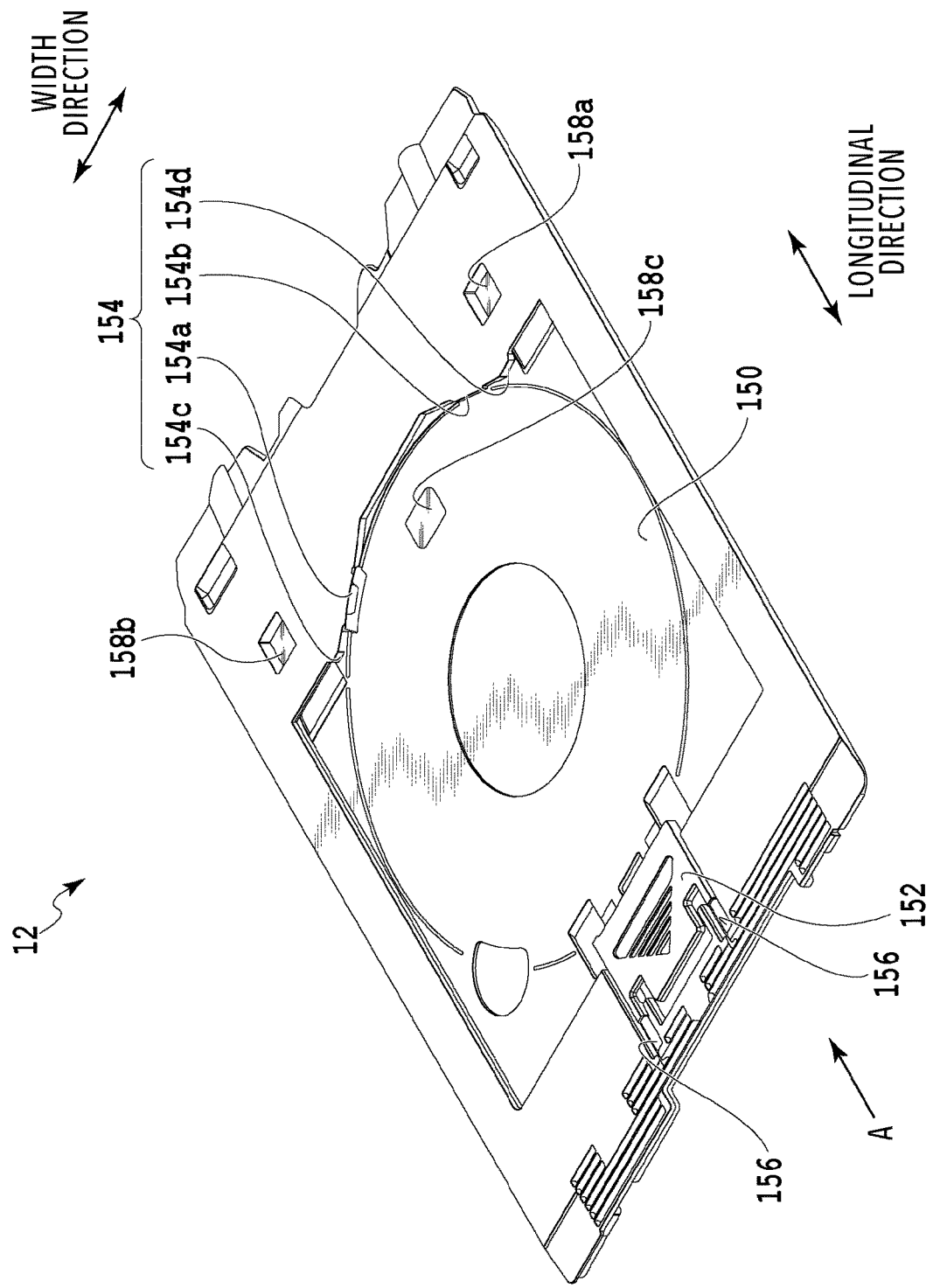
FIG. 3 is a perspective view of a schematic configuration of a tray.

FIG. 3 is a perspective view of a schematic configuration of the tray 12 that holds a print medium. In the printing apparatus 10, a print medium, such as an optical disk, is conveyed and printed while being held by the tray 12. The tray 12 (holding unit) includes a recess (placement portion) 150 where the print medium can be placed and a pressing member 152 that presses the print medium placed in the recess 150.

In the recess 150, the print medium is held by abutment portions 154 disposed on one side in the longitudinal direction of the tray 12 and the pressing member 152 disposed on the other side in the longitudinal direction. The pressing member 152 is urged by elastic members 156 in the arrow A direction toward the abutment portion 154 side. Consequently, the print medium held in the recess 150 is pressed against the abutment portions 154 by the pressing member 152.

The recess 150 has a shape capable of selectively holding a print medium of multiple types. In the present embodiment, the recess 150 has a shape capable of holding an optical disk D, a nail-sticker mount NM, and a card mount CM (auxiliary member). FIG. 4A is a diagram illustrating the tray holding an optical disk D. Examples of the optical disk D include CD (Compact Disc), DVD (Digital Versatile Disc), and BD (Blu-ray Disc). Note that such optical disks D have, for example, an ink receiving layer on the surface on which printing is performed by the printing apparatus 10. When the optical disk D is held by the tray 12, the outer circumference of the optical disk D is held by the abutment portions 154a and 154b formed obliquely relative to the width direction of the tray 12 (the direction orthogonal to the longitudinal direction) and an abutment portion 152a of the pressing member 152. The abutment portion 152a of the pressing member 152 is formed approximately at the center of the pressing member 152 in the width direction (approximately in parallel with the width direction of the tray 12).

FIG. 4B is a diagram illustrating the tray 12 holding a nail-sticker mount NM. The nail-sticker mount NM having multiple nail stickers Ns thereon is a plastic member in a plate shape. On the nail-sticker mount NM, nail stickers Ns for nail art having different sizes are neatly arranged. Note that each nail sticker Ns has an ink receiving layer formed on its surface (the surface to be printed on). In the case where the nail-sticker mount NM is held by the tray 12, the outer portions of the nail-sticker mount NM is held by the abutment portions 154c and 154d formed approximately in parallel with the width direction of the tray 12 and abutment portions 152b and 152c of the pressing member 152. The abutment portions 152b and 152c of the pressing member 152 are formed such that the abutment portion 152a is in between in the width direction of the pressing member 152.

FIG. 4C is a diagram illustrating the tray 12 holding a card mount CM. FIG. 4D is a diagram illustrating cards Cd set on the card mount CM held by the tray 12. The card mount CM, for example, has a first fitting portion 160 and a second fitting portion 162 into each of which a print medium composed of a resin material formed in a card shape (hereinafter referred to as a "card Cd") can be fit and held. The first fitting portion 160 has a detection hole 160a in its center. The second fitting portion 162 also has a detection hole 162a in its center.

The card Cd is, for example, of a credit card size and has an ink receiving layer formed on at least part of its surface (the surface to be printed on). The recess 150 that holds one optical disk D can hold two cards having a typical size (for example, a credit card, 53.98 mm×85.6 mm in size). Thus, the card mount CM has the first fitting portion 160 and the second fitting portion 162 so that two cards Cd can be placed. Note that since the tray 12 is formed to be adapted to the size of the optical disk D, the space between the first fitting portion 160 and the second fitting portion 162 is relatively small. The outer shape of the card mount CM is approximately the same as that of the nail-sticker mount NM. Thus, in the case where the card mount CM is held by the tray 12, the outer portions of the card mount CM is held by the abutment portions 154c and 154d and the abutment portions 152b and 152c of the pressing member 152. The surfaces (the surfaces facing the optical sensor 50) of the card Cd and the card mount CM have higher light reflectance than the surface of the tray 12. It is assumed that there is a difference of a certain value or more between the light reflectances of the card Cd and card mount CM and the reflectance of the tray 12.

Returning to FIG. 3, the tray 12 has three reflecting portions 158 (detection portions) the light reflectance of which is higher than that of the other part of the tray 12. A first reflecting portion 158a and a second reflecting portion 158b are located outside the recess 150 (outside the holding area of the optical disk D) and on the one side the tray 12 in the longitudinal direction. A third reflecting portion 158c is located inside the recess 150. In the case where the recess 150 holds an optical disk D, the third reflecting portion 158c is, for example, on the center line O1 extending in the longitudinal direction, on which the center of the optical disk D is positioned (see FIG. 4A). The third reflecting portion 158c is at a position where it is not exposed through the hole DH (described later) of the optical disk D in the case where the optical disk D is held in the recess 150, and where it is also not exposed through a detection hole 160a or 162a in the case where the card mount CM is held in the recess 150.

Meanwhile, the optical sensor 50 receives diffuse-reflected light of the light that the optical sensor 50 itself emits and the output value changes according to the amount of the received light. For the optical sensor 50 in the present embodiment, the more the amount of the received light is, the smaller the output value is. The first reflecting portion 158a, second reflecting portion 158b, and third reflecting portion 158c reflect light emitted by the optical sensor 50 in a larger amount than the other part of the tray 12 does. Thus, checking the output value of the optical sensor 50 enables detection of whether each reflecting portion is present as well as the position of each reflecting portion.

Next, conveyance of the tray 12 will be described. When the tray 12 holding a print medium for printing is inserted into the printing apparatus 10, the printing apparatus 10 conveys the print medium together with the tray 12. FIG. 5A is a diagram illustrating a state where the tray 12 holding an optical disk D is inserted into the printing apparatus 10. FIG. 5B is a diagram illustrating a state where the tray 12 is conveyed from the state in FIG. 5A in the returning direction of the conveyance direction. Note that in the following description, the direction from the upstream side toward the downstream side of the conveyance direction is referred to as the going direction, and the direction from the downstream side toward the upstream side of the conveyance direction is referred to as the returning direction as appropriate.

The tray 12 holding the optical disk D is inserted into the printing apparatus 10 from the downstream side of the conveyance direction. At this time, the tray 12 is inserted such the side on which the first reflecting portion 158a and the second reflecting portion 158b are located go in first. The inserted tray 12 is conveyed in the returning direction of the conveyance direction, being nipped by the second conveying roller 24 and the second driven rollers 28 with its movement in the scanning direction restricted by the tray guides 31.

The second driven rollers 28 are located at two positions outside the recess 150 of the tray 12 in the width direction at the time when the tray 12 is being conveyed. Each of the second driven rollers 28 should preferably be located equidistant from the center line O2 of the tray 12 in its width direction (the scanning direction) at the time when the tray 12 is conveyed with its movement in the scanning direction restricted by the tray guides 31. The second driven rollers 28 are located upstream of the second conveying roller 24 in the conveyance direction.

The tray 12 conveyed in the returning direction by the second conveying roller 24 is nipped by the first conveying roller 22 and the first driven rollers 26 (see FIG. 5B). With this configuration, the tray 12 is conveyed by the first conveying roller 22 (and the first driven rollers 26) and the second conveying roller 24 (and the second driven rollers 28).

Figure 6:
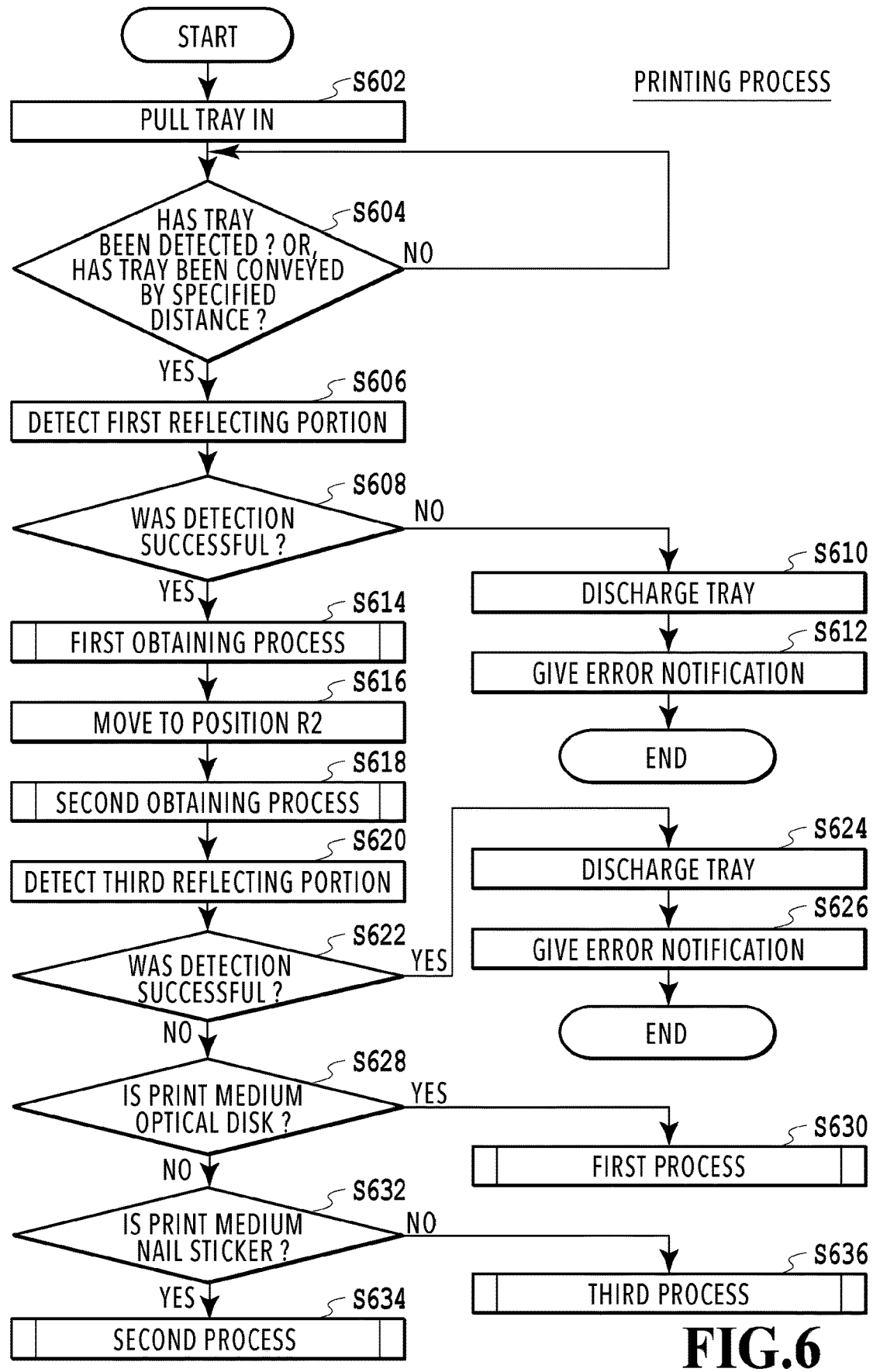
FIG. 6 is a flowchart illustrating the process routine of a printing process.

With the above configuration, a case where printing is performed on a print medium held by the tray 12 will be described. When the tray 12 holding a print medium is inserted from the downstream side of the conveyance, and the start of printing is instructed via the operation panel 122, a printing process starts. Note that before the user instructs the start of printing, the user inputs a print job including various pieces of information such as image data and print conditions into the printing apparatus 10. FIG. 6 is a flowchart illustrating the process routine of the printing process.

When the printing process starts, the tray 12 inserted from the downstream side of the conveyance direction is, first, pulled into the apparatus (S602). Specifically, at S602, the tray 12 nipped by the second conveying roller 24 and the second driven rollers 28 is conveyed in the returning direction (see FIG. 5A). Note that when the tray 12 is conveyed to a certain extent, the tray 12 is nipped by the first conveying roller 22 and the first driven rollers 26, and the tray 12 is conveyed by the first conveying roller 22 and the second conveying roller 24 (see FIG. 5B).

Next, it is determined whether the edge sensor 30 has detected the tray 12, and it is also determined whether the tray 12 has been conveyed in the returning direction by a specified distance (S604). The second conveying roller 24 has the rotary encoder 132. To be more specific, in the printing apparatus 10, the controller 100 can detect the conveyance distance of the tray 12 based on the output results from the rotary encoder 132. At S604, the controller 100 determines based on the output from the rotary encoder 132 whether the tray 12 has been conveyed by the specified distance and also determines based on the detection result of the edge sensor 30 whether the tray 12 has been detected.

If it is determined at S604 that the tray 12 has been conveyed by the specified distance or that the edge sensor 30 has detected the tray 12, the first reflecting portion 158a is, next, detected (S606). Specifically, at S606, first, the carriage 32 positioned at the standby position is moved in the forward direction to move the optical sensor 50 to a position where the first reflecting portion 158a is expected to be positioned. Then, the tray 12 is moved in the going direction to detect the first reflecting portion 158a with the optical sensor 50.

Note that the standby position is a position where the carriage 32 (the print head 34) waits when printing is not being performed, and it is, for example, a position over the recovery part 18. The information on the position where the first reflecting portion 158a on the tray 12 is expected to be positioned in the scanning direction (first direction) is stored in the controller 100 in advance. Note that the positional information on the optical sensor 50 is obtained based on the positional information on the carriage 32 detected by the linear encoder 134.

Figure 7A:
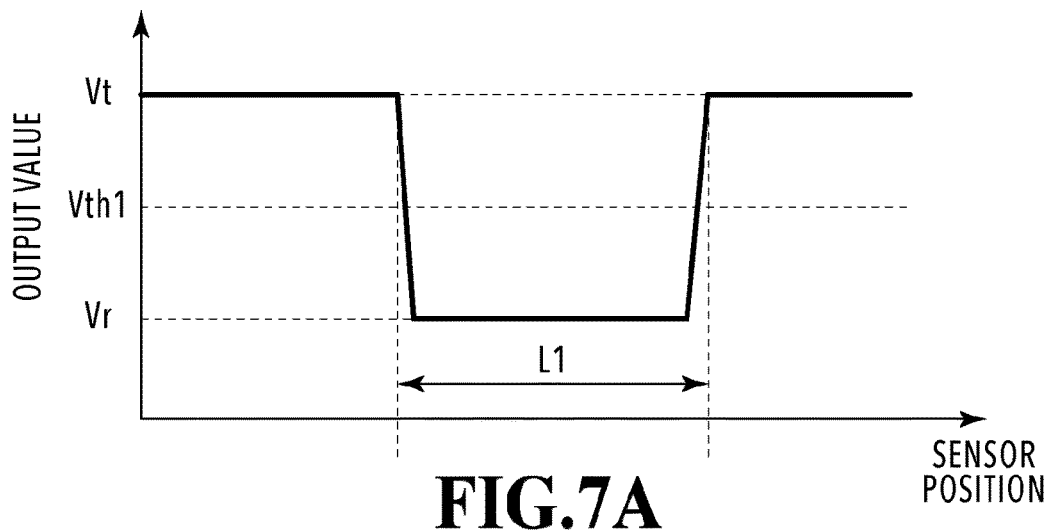
FIGS. 7A, 7B, and 7C are diagrams for explaining detection of a reflecting portion.
Figure 7B:
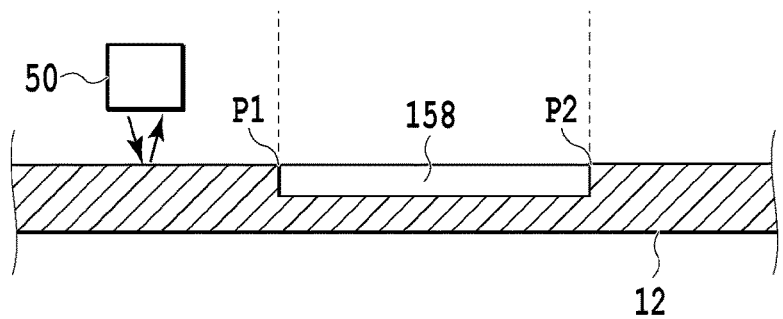
Figure 7C:
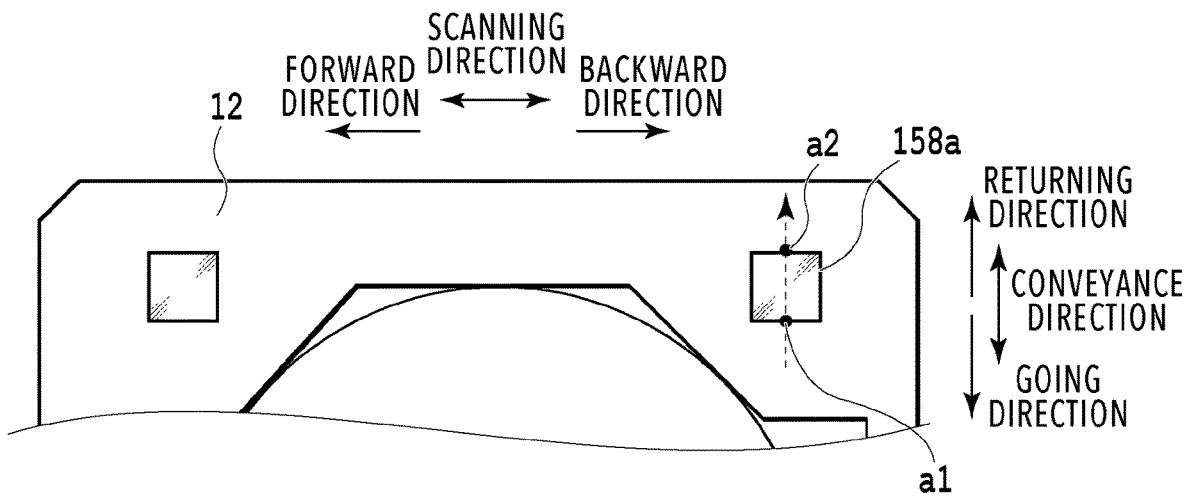

Here, detection of the reflecting portions 158 by the optical sensor 50 will be described. FIG. 7A is a graph illustrating change in the output value of the optical sensor 50 relative to its position. FIG. 7B is a cross-sectional view of a reflecting portion 158 and its periphery corresponding to the position of the optical sensor 50 illustrated in FIG. 7A. FIG. 7C is a diagram illustrating the edges a1 and a2 of the first reflecting portion 158a detected during detection and the relative moving direction of the optical sensor 50 during the detection.

As described above, in the tray 12, the reflecting portion 158 reflects light emitted by the optical sensor 50 in a larger amount than the other part of the tray 12. Accordingly, the amount of light received by the optical sensor 50 is larger and thus the output value of the optical sensor 50 is smaller when the reflecting portion 158 is being detected than when the other part of the tray 12 is being detected.

Thus, to detect the reflecting portion 158, it is determined whether the output value of the optical sensor 50 is less than a threshold Vth1 (see FIG. 7A). Then, the positions where the output value becomes less than threshold Vth1 are detected as the positional information (coordinate values) indicating edges P1 and P2 of the reflecting portion 158. Note that when the reflecting portion 158 is detected, the length L1 between both detected edges is also obtained. To be more specific, in the case where the edges of the reflecting portion 158 in the conveyance direction (second direction) are detected, the length between both edges detected based on the conveyance distance of the tray 12 in the conveyance direction is obtained. In the case where the edges of the reflecting portion 158 in the scanning direction are detected, the length between both edges detected based on the moving distance of the carriage 32 in the scanning direction is obtained. The moving distance of the carriage 32 in the scanning direction is obtained by the controller 100 based on the detection results of the linear encoder 134.

Thus, at S606, as illustrated in FIG. 7C, the edge a1 on the downstream side of the first reflecting portion 158a in the conveyance direction and the edge a2 on the upstream side of the first reflecting portion 158a in the conveyance direction are detected, and the length between the edge a1 and the edge a2 is also calculated.

After that, it is determined whether the first reflecting portion 158a was able to be detected (S608). In other words, at S608, it is determined whether the edges a1 and a2 of the first reflecting portion 158a were detected, and also whether the length between the edges a1 and a2 is within a specified range. At S608, if one of the edges a1 and a2 was not detected or where the length between the edges a1 and a2 is not within the specified range, it is determined that the first reflecting portion 158a cannot be detected, in other words, that the tray 12 cannot be accurately detected, and the tray 12 is discharged (S610). Specifically, at S610, the tray 12 is conveyed in the going direction. Then, an error massage indicating that the tray 12 cannot be detected is shown to the user via the display 124 or the like (S612), and this printing process ends.

Figure 8:
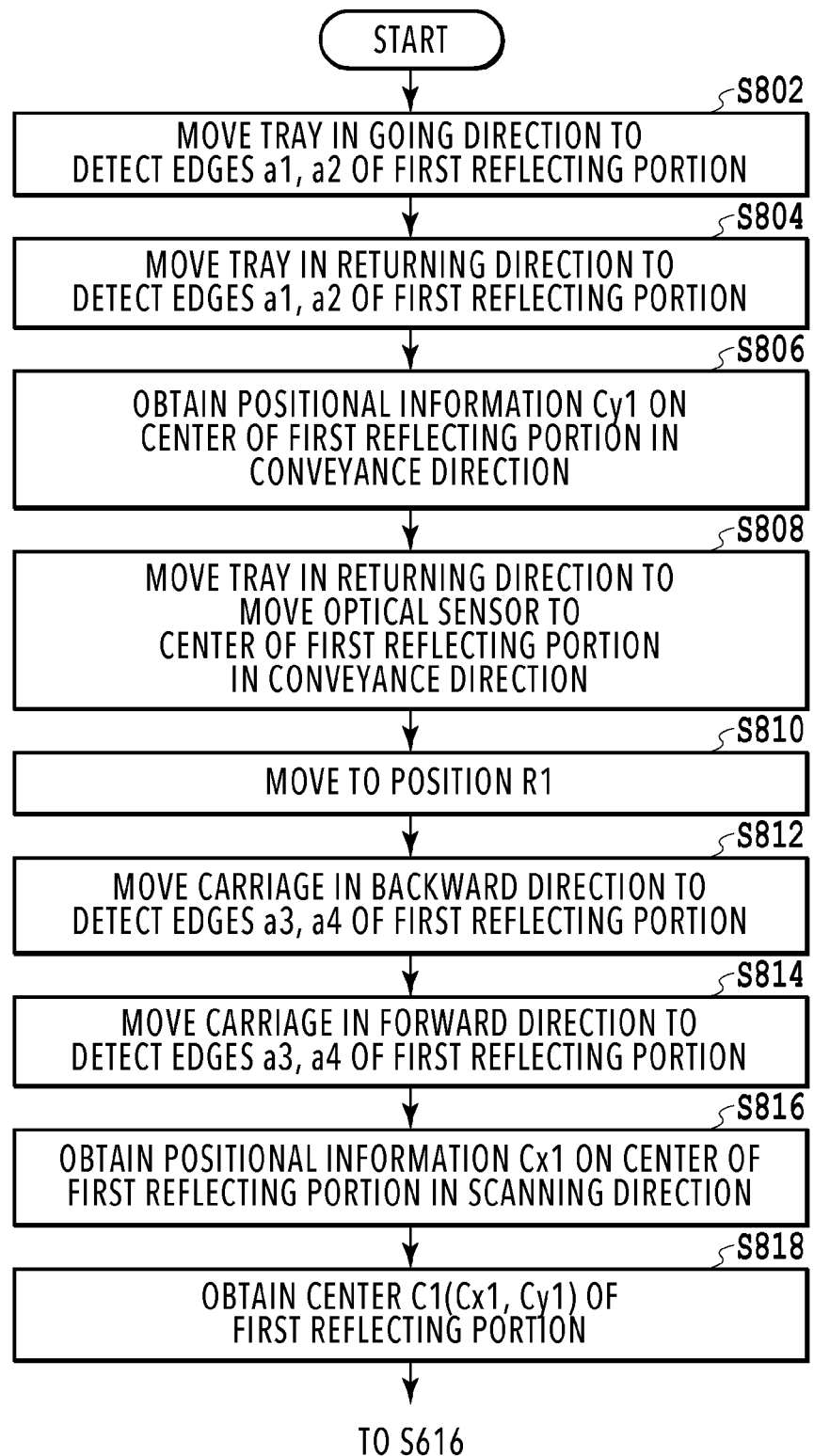
FIG. 8 is a flowchart illustrating the process routine of a first obtaining process.
Figure 9A:
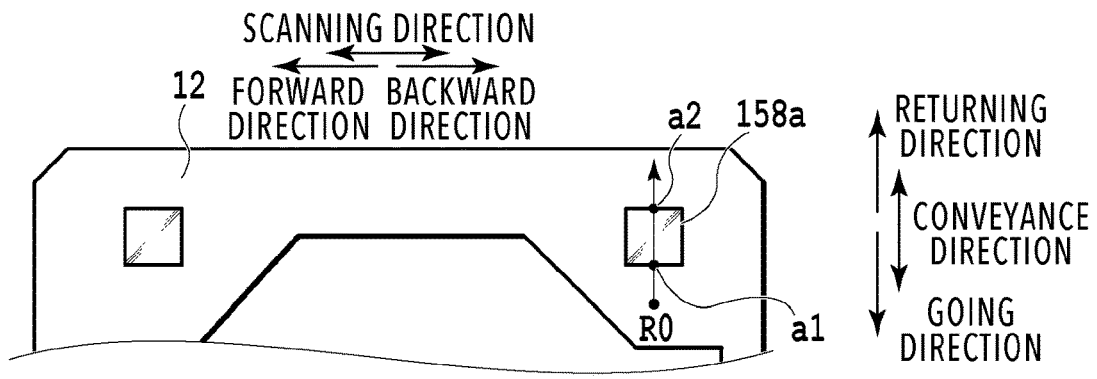
FIGS. 9A, 9B, 9C, and 9D are diagrams illustrating relative moving directions of an optical sensor in detecting a first reflecting portion.
Figure 9B:
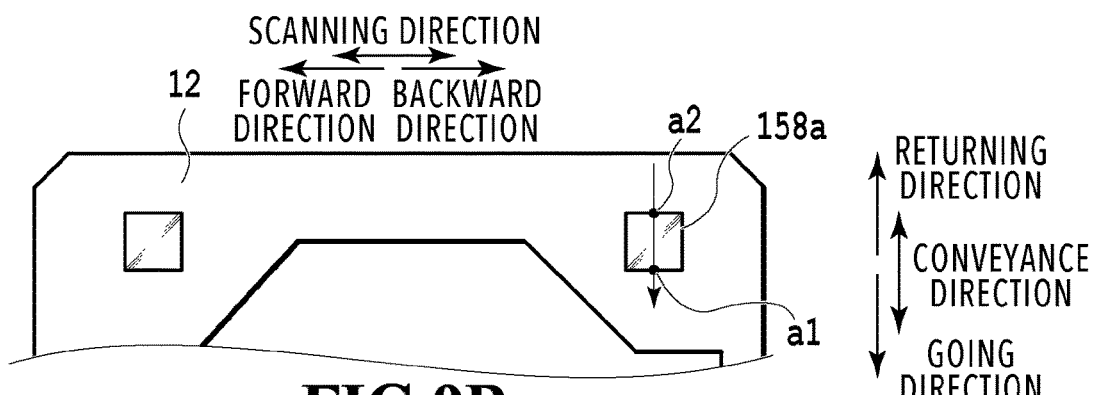
Figure 9C:
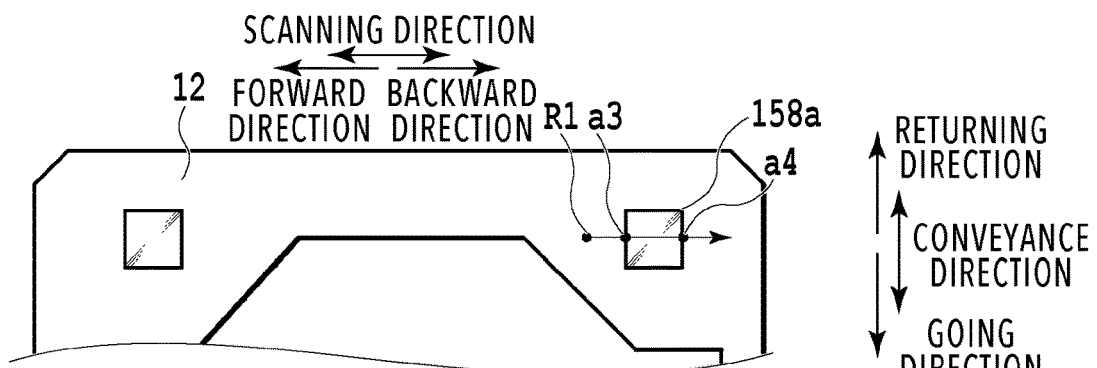
Figure 9D:
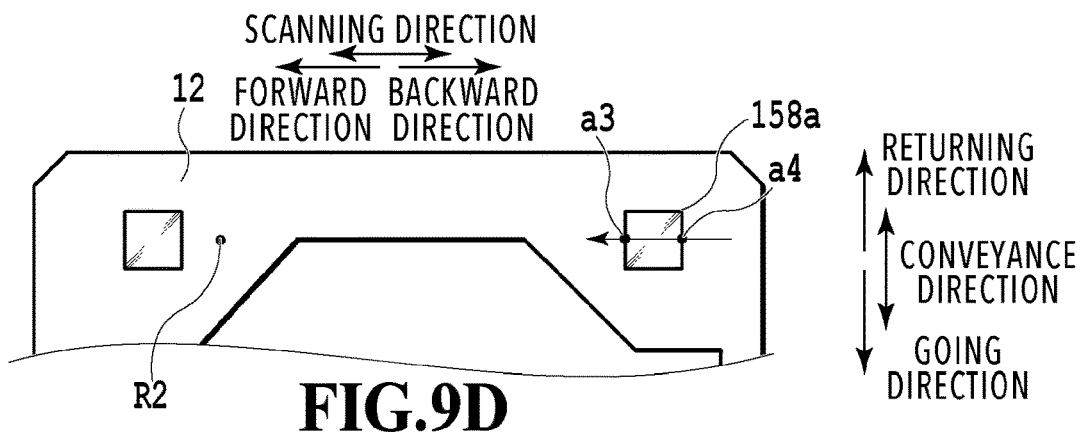

On the other hand, if at S608, the edges a1 and a2 were detected, and the length between the edges a1 and a2 is within the specified range, it is determined that the first reflecting portion 158a was able to be detected, and then a first obtaining process is performed to obtain the center C1 of the first reflecting portion 158a (S614). FIG. 8 is a flowchart illustrating the process routine of the first obtaining process for obtaining the center C1 of the first reflecting portion 158a, which is a subroutine of the printing process. FIG. 9A is a diagram illustrating the relative moving direction of the optical sensor 50 and the edges a1 and a2 of the first reflecting portion 158a to be detected for the case where the tray 12 is conveyed in the going direction. FIG. 9B is a diagram illustrating the relative moving direction of the optical sensor 50 and the edges a1 and a2 of the first reflecting portion 158a to be detected for the case where the tray 12 is conveyed in the returning direction. FIG. 9C is a diagram illustrating the moving direction of the optical sensor 50 and the edges a3 and a4 of the first reflecting portion 158a to be detected for the case where the carriage 32 is conveyed in the backward direction. FIG. 9D is a diagram illustrating the moving direction of the optical sensor 50 and the edges a3 and a4 of the first reflecting portion 158a to be detected for the case where the carriage 32 is conveyed in the forward direction.

In the first obtaining process at this S614, first the tray 12 is conveyed in the returning direction to move the optical sensor 50 to the position R0, and then the tray 12 is conveyed in the going direction to detect the edges a1 and a2 of the first reflecting portion 158a in the conveyance direction (S802). Note that the position R0 is downstream of the reflecting portion 158a in the conveyance direction and a specified distance away. At S802, the positional information on the edge a1 in the conveyance direction is obtained when the detection point of the optical sensor 50 enters the first reflecting portion 158a. The positional information on the edge a2 in the conveyance direction is obtained when the detection point of the optical sensor 50 gets out of the first reflecting portion 158a (see FIG. 9A). Note that in the present embodiment, the positional information in the conveyance direction is obtained, for example, based on the detection results of the rotary encoder 132.

Next, the tray 12 is conveyed in the returning direction to detect the edges a1 and a2 of the first reflecting portion 158a in the conveyance direction (S804). At S804, the positional information on the edge a2 in the conveyance direction is obtained when the detection point of the optical sensor 50 enters the first reflecting portion 158a. The positional information on the edge a1 in the conveyance direction is obtained when the detection point of the optical sensor 50 gets out of the first reflecting portion 158a (see FIG. 9B).

After that, using the positional information in the conveyance direction on the edge a1 detected at S802 and the edge a2 detected at S804, positional information Cy1 on the center of the first reflecting portion 158a in the conveyance direction is obtained (S806). At S806, the midpoint between the positional information on the edge a1 and the positional information on the edge a2, detected when the detection point of the optical sensor 50 entered the first reflecting portion 158a, is obtained as the positional information Cy1 on the center of the first reflecting portion 158a in the conveyance direction.

Meanwhile, the waveform based on the output value at the time when the detection point of the optical sensor 50 enters the reflecting portion 158 and the waveform based on the output value at the time when the detection point of the optical sensor 50 gets out of the reflecting portion 158 have different characteristics. This causes a little systematic discrepancy in the positional information obtained based on those output values. To address this, the positional information on the center of the reflecting portion 158 is obtained at S806 based on the output values at the times when the detection point of the optical sensor 50 enters the reflecting portion 158 to improve accuracy in the positional information.

After the positional information Cy1 on the center in the conveyance direction is obtained, next the tray 12 is conveyed in the going direction to position the optical sensor 50 at the center (Cy1) of the first reflecting portion 158a in the conveyance direction (S808). After that, the carriage 32 is moved in the forward direction until the optical sensor 50 reaches the position R1 (see FIG. 9C), which is a specified distance away from the first reflecting portion 158a in the scanning direction (S810).

Then, the carriage 32 is moved in the backward direction to detect the edges a3 and a4 of the first reflecting portion 158a in the scanning direction (S812). At S812, the positional information on the edge a3 in the scanning direction is obtained when the detection point of the optical sensor 50 enters the first reflecting portion 158a. The positional information on the edge a4 in the scanning direction is obtained when the detection point of the optical sensor 50 gets out of the first reflecting portion 158a (see FIG. 9C).

Next, the carriage 32 is moved in the forward direction to detect the edges a3 and a4 of the first reflecting portion 158a in the scanning direction (S814). At S814, the positional information on the edge a4 in the scanning direction is obtained when the detection point of the optical sensor 50 enters the first reflecting portion 158a. The positional information on the edge a3 in the scanning direction is obtained when the detection point of the optical sensor 50 gets out of the first reflecting portion 158a (see FIG. 9D).

After that, using the positional information in the scanning direction on the edge a3 detected at S812 and the edge a4 detected at S814, positional information Cx1 on the center of the first reflecting portion 158a in the scanning direction is obtained (S816). In other words, at S816, the midpoint between the positional information on the edge a3 and the positional information on the edge a4, detected when the detection point of the optical sensor 50 entered the first reflecting portion 158a, is obtained as the positional information Cx1 on the center of the first reflecting portion 158a in the scanning direction. Then, the center C1 (Cx1, Cy1) of the first reflecting portion 158a is obtained based on the positional information obtained at S806 and S816 (S818).

Note that when the edges of the first reflecting portion 158a are obtained at S802, S804, S812, and S814, in the case where one or both of the edges cannot be obtained, or in the case where the length between the edges is not within the specified range, it is determined that the tray 12 cannot be detected accurately. In this case, the tray 12 is discharged, and an error message is shown to the user via the display 124 or the like.

Returning to FIG. 6, after the center C1 of the first reflecting portion 158a is obtained in the first obtaining process, next the optical sensor 50 is moved to the position R2 (S616). In other words, at S616, the carriage 32 is moved in the forward direction until the optical sensor 50 reaches the position R2, which is a specified distance away from the second reflecting portion 158b in the scanning direction (see FIG. 9D). For the movement to the position R2, for example, the carriage 32 may move by a moving distance set in advance, or the carriage 32 may move by a certain distance after detecting the second reflecting portion 158b in the movement in the scanning direction.

Figure 10:
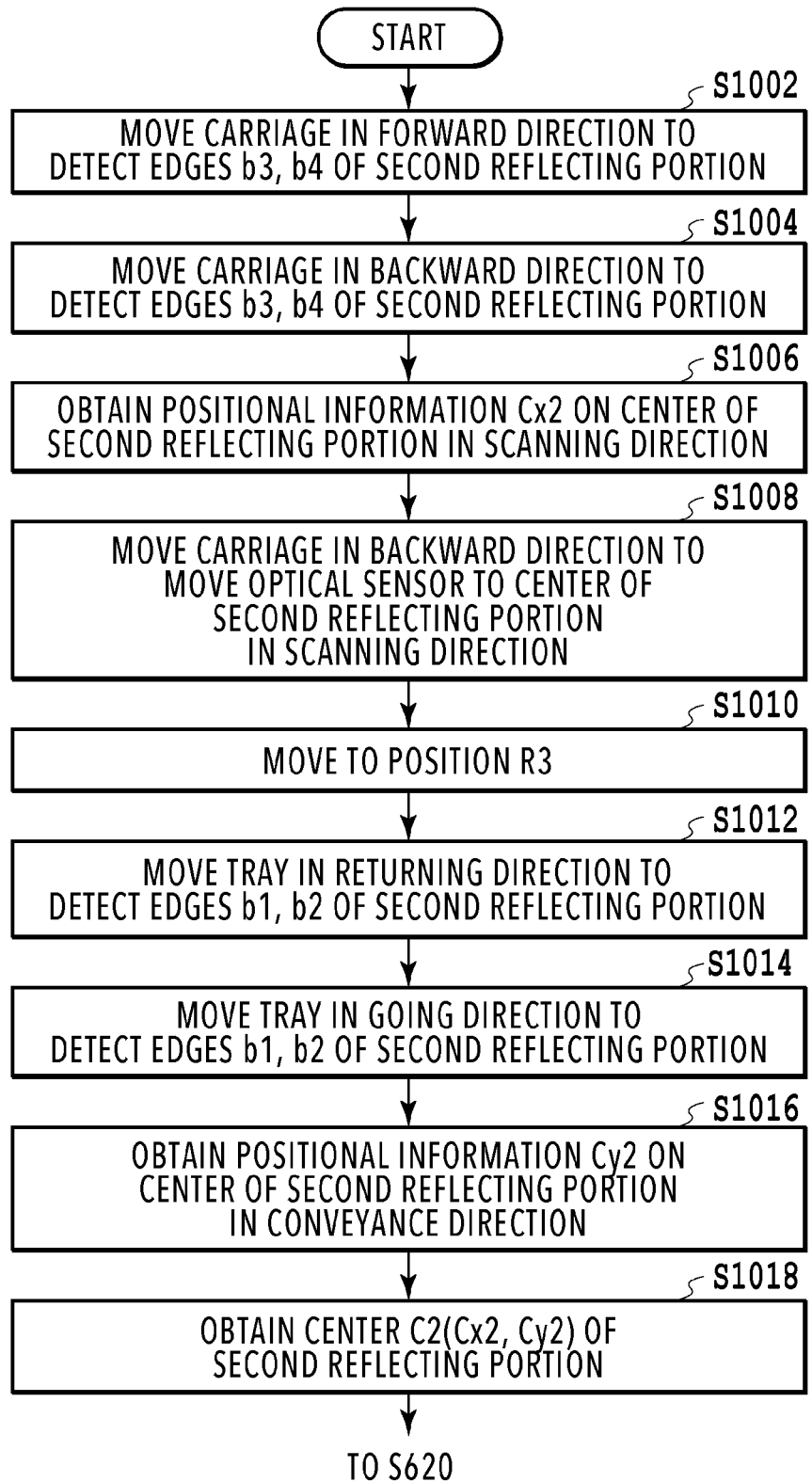
FIG. 10 is a flowchart illustrating the process routine of a second obtaining process.
Figure 11A:
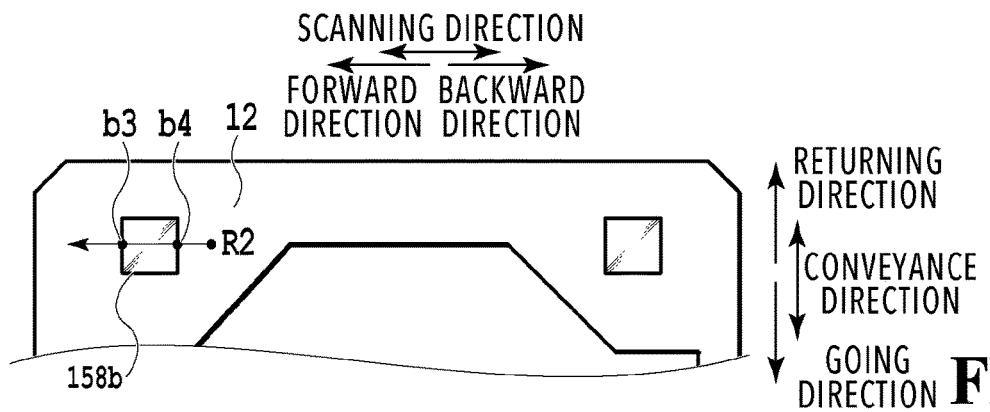
FIGS. 11A, 11B, 11C, and 11D are diagrams illustrating relative moving directions of the optical sensor in detecting a second reflecting portion.
Figure 11B:
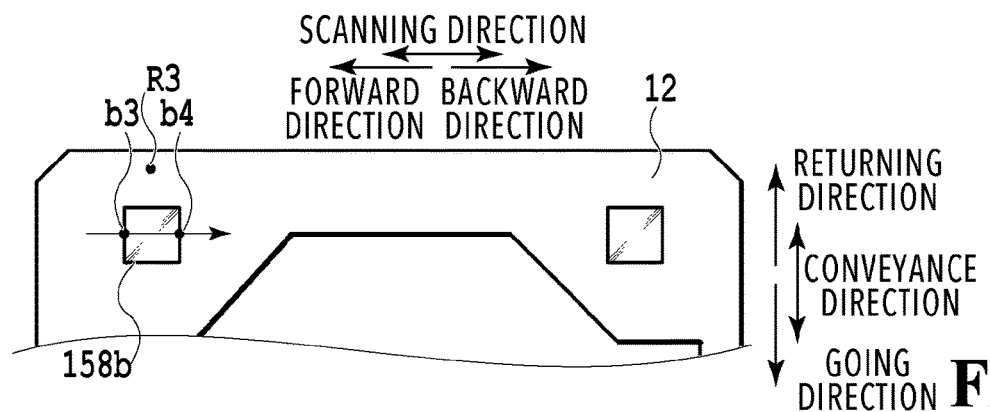
Figure 11C:
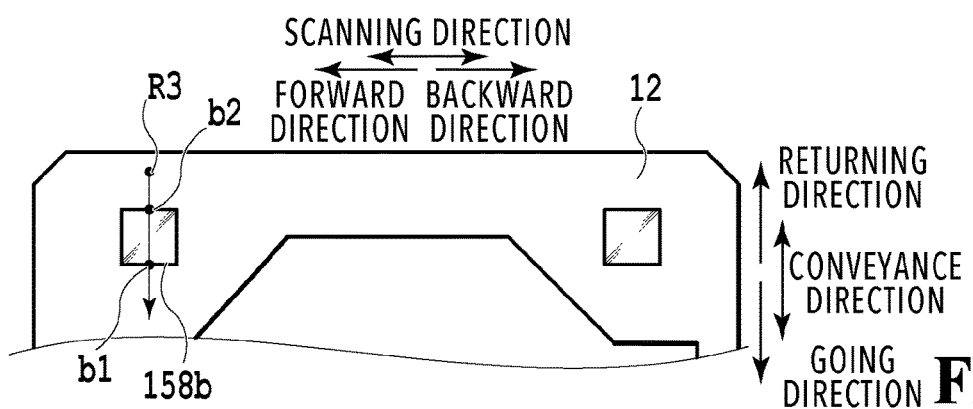
Figure 11D:
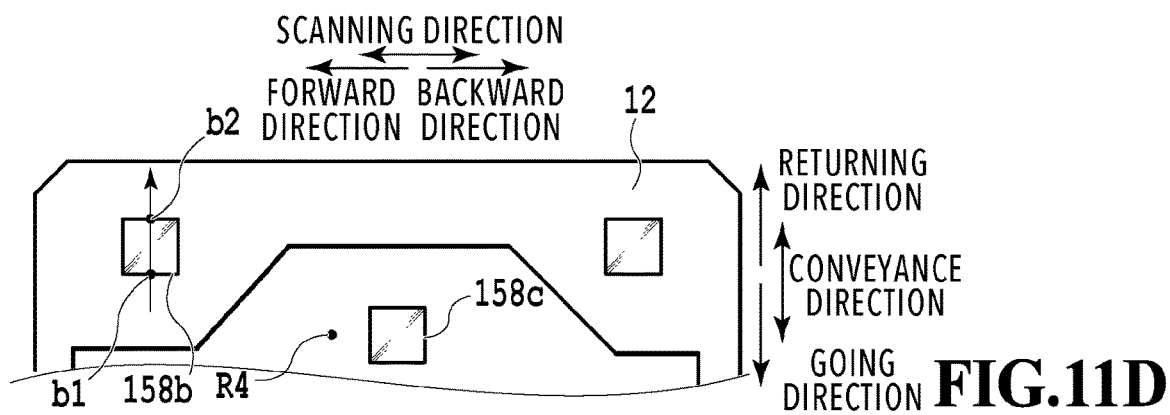

After that, a second obtaining process is performed for obtaining the center C2 of the second reflecting portion 158b (S618). FIG. 10 is a flowchart illustrating the process routine of the second obtaining process for obtaining the center C2 of the second reflecting portion, which is a subroutine of the printing process. FIG. 11A is a diagram illustrating the moving direction of the optical sensor 50 and edges b3 and b4 of the second reflecting portion 158b to be detected for the case where the carriage 32 is moved in the forward direction. FIG. 11B is a diagram illustrating the moving direction of the optical sensor 50 and the edges b3 and b4 of the second reflecting portion 158b to be detected for the case where the carriage 32 is moved in the backward direction. FIG. 11C is a diagram illustrating the relative moving direction of the optical sensor 50 and edges b1 and b2 of the second reflecting portion 158b to be detected for the case where the tray 12 is conveyed in the returning direction. FIG. 11D is a diagram illustrating the relative moving direction of the optical sensor 50 and the edges b1 and b2 of the second reflecting portion 158b to be detected for the case where the tray 12 is conveyed in the going direction.

In the second obtaining process at S618, first the carriage 32 is moved in the forward direction to detect the edges b3 and b4 of the second reflecting portion 158b in the scanning direction (S1002). At S1002, the positional information on the edge b4 in the scanning direction is obtained when the detection point of the optical sensor 50 enters the second reflecting portion 158b. The positional information on the edge b3 in the scanning direction is obtained when the detection point of the optical sensor 50 gets out of the second reflecting portion 158b (see FIG. 11A).

Next, the carriage 32 is moved in the backward direction to detect the edges b3 and b4 of the second reflecting portion 158b in the scanning direction (S1004). At S1004, the positional information on the edge b3 in the scanning direction is obtained when the detection point of the optical sensor 50 enters the second reflecting portion 158b. The positional information on the edge b4 in the scanning direction is obtained when the detection point of the optical sensor 50 gets out of the second reflecting portion 158b (see FIG. 11B).

After that, using the positional information in the scanning direction on the edge b4 detected at S1002 and the edge b3 detected at S1004, positional information Cx2 on the center of the second reflecting portion 158b in the scanning direction is obtained (S1006). Specifically, at S1006, the midpoint between the positional information on the edge b3 and the positional information on the edge b4, detected when the detection point of the optical sensor 50 entered the second reflecting portion 158b, is obtained as the positional information Cx2 on the center of the second reflecting portion 158b in the scanning direction.

After the positional information Cx2 on the center in the scanning direction is obtained, next the carriage 32 is moved in the forward direction to position the optical sensor 50 at the center (Cx2) of the second reflecting portion 158b in the scanning direction (S1008). After that, the tray 12 is conveyed in the going direction until the optical sensor 50 reaches the position R3, which is upstream of the second reflecting portion 158b in the conveyance direction and a specified distance away (S1010).

Then, the tray 12 is conveyed in the returning direction to detect the edges b and b2 of the second reflecting portion 158b in the conveyance direction (S1012). At S1012, the positional information on the edge b2 in the conveyance direction is obtained when the detection point of the optical sensor 50 enters the second reflecting portion 158b. The positional information on the edge b1 in the conveyance direction is obtained when the detection point of the optical sensor 50 gets out of the second reflecting portion 158b (see FIG. 11C).

Next, the tray 12 is conveyed in the going direction to detect the edges b1 and b2 of the second reflecting portion 158b in the conveyance direction (S1014). At S1014, the positional information on the edge b1 in the conveyance direction is obtained when the detection point of the optical sensor 50 enters the second reflecting portion 158b. The positional information on the edge b2 in the conveyance direction is obtained when the detection point of the optical sensor 50 gets out of the second reflecting portion 158b (see FIG. 11D).

After that, using the positional information in the conveyance direction on the edge b2 detected at S1012 and the edge b1 detected at S1014, positional information Cy2 on the center of the second reflecting portion 158b in the conveyance direction is obtained (S1016). In other words, at S1016, the midpoint between the positional information on the edge b1 and the positional information on the edge b2, detected when the detection point of the optical sensor 50 entered the second reflecting portion 158b, is obtained as the positional information Cy2 on the center of the second reflecting portion 158b in the conveyance direction. Then, the center C2 (Cx2, Cy2) of the second reflecting portion 158b is obtained based on the positional information obtained at S1006 and S1016 (S1018).

Note that when the edges of the second reflecting portion 158b are obtained at S1002, S1004, S1012, and S1014, in the case where one or both of the edges cannot be obtained, or in the case where the length between the edges is not within a specified range, it is determined that the tray 12 cannot be detected. In this case, the tray 12 is discharged, and an error message is shown to the user via the display 124 or the like.

In the first obtaining process at S614 and the second obtaining process at S618, the conveyance speed of the tray 12 may be approximately the same as or slower than the speed at the time of detecting the first reflecting portion 158a at S606. In a case where the conveyance speed of the tray 12 is set slower, for example, the conveyance speed in S606 is set to 2.00 ips, and the conveyance speed in S614 and S618 is set to 0.67 ips. Setting the conveyance speed of the tray 12 slower makes higher the accuracy in detecting the edges of the reflecting portion 158 in S614 and S618 than in S606.

Returning to FIG. 6, after the center C2 of the second reflecting portion 158b is obtained in the second obtaining process, next the third reflecting portion 158c is detected (S620). In other words, at S620, first the tray 12 is conveyed in the returning direction until the optical sensor 50 reaches the position where the optical sensor 50 is expected to face the center of the third reflecting portion 158c in the conveyance direction, the information of which is stored in advance. Next, the carriage 32 is moved in the backward direction to position the optical sensor 50 at the position facing the position R4 (see FIG. 11D), which is the specified distance away from the third reflecting portion 158c in the scanning direction. After that, the carriage 32 is moved in the backward direction to detect both edges of the third reflecting portion 158c in the scanning direction.

When the operation for detecting the third reflecting portion 158c finishes, it is determined whether the third reflecting portion 158c was able to be detected (S622). Here, in the case where the tray 12 is not holding a print medium, the third reflecting portion 158c is exposed to the optical sensor 50, and thus the optical sensor 50 can detect it. Note that detection of the third reflecting portion 158c is performed in the same manner as for the detection of the edges of the first reflecting portion 158a or the second reflecting portion 158b in the scanning direction, and thus description thereof is omitted. On the other hand, in the case where the tray 12 is holding a print medium, the third reflecting portion 158c is covered with the print medium, and thus the optical sensor 50 cannot detect the third reflecting portion 158c.

If it is determined at S622 that the third reflecting portion 158c was able to be detected, it is determined that the tray 12 is not holding a print medium, and the tray 12 is discharged (S624). After that, an error message indicating that there is no set print medium is shown to the user via the display 124 or the like (S626), and this printing process ends. On the other hand, in the case where it is determined at S622 that the third reflecting portion 158c was not able to be detected, it is determined whether the print medium held by the tray 12 is an optical disk D (S628). Specifically, at S628, it is determined based on the information inputted by the user as a print job whether the print medium is an optical disk D.

If it is determined at S628 that the print medium is an optical disk D, a first process, which is a printing process for an optical disk D, is performed (S630). If it is determined at S628 that the print medium is not an optical disk D, it is determined whether the print medium is a nail sticker Ns (S632). Specifically, at S632, it is determined based on the information inputted by the user as a print job whether the print medium is a nail sticker Ns.

If it is determined at S632 that the print medium is a nail sticker Ns, a second process, which is a printing process for a nail sticker Ns, is performed (S634). If it is determined at S632 that the print medium is not a nail sticker Ns but a card Cd, a third process, which is a printing process for a card Cd, is performed (S636).

The determination as above on the first process, second process, and third process based on the type of the print medium is executed by the controller 100. In other words, in the present embodiment, the controller 100 functions as a determining unit that determines the process for obtaining positional information on a print medium based on the type of the print medium.

First Process

Figure 12:
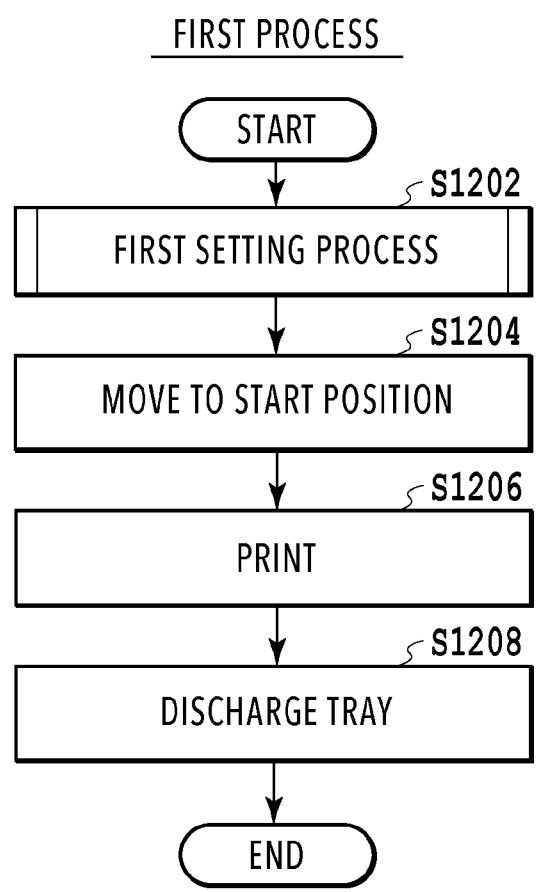
FIG. 12 is a flowchart illustrating the process routine of a first process.

FIG. 12 is a flowchart illustrating the process routine of the first process. This first process is for performing printing on the print surface of the optical disk D. The optical disk D is directly placed on the tray 12 unlike a card Cd and a nail sticker Ns and requires high accuracy in the print position. Thus, the position of the optical disk D in the scanning direction and in the conveyance direction is obtained from the detection results of the optical sensor 50, and the positional information on the center of the optical disk having high detection accuracy is used to obtain the print position with high accuracy.

In the first process at S630, a first setting process is first performed for setting the print position (hereinafter the "print position" is also referred to as the "print start position") based on the center of the optical disk D (S1202). Note that the first setting process will be described later. Next, the tray 12 is conveyed to the print start position based on the print position set in the first setting process (S1204), the position of the print head 34 on the carriage 32 is adjusted to the position of the optical disk D, and printing start (S1206). Then, when the printing finishes, the tray 12 is discharged to the outside of the apparatus (S1208), and this first process ends, which finishes the printing process.

Figure 13B:
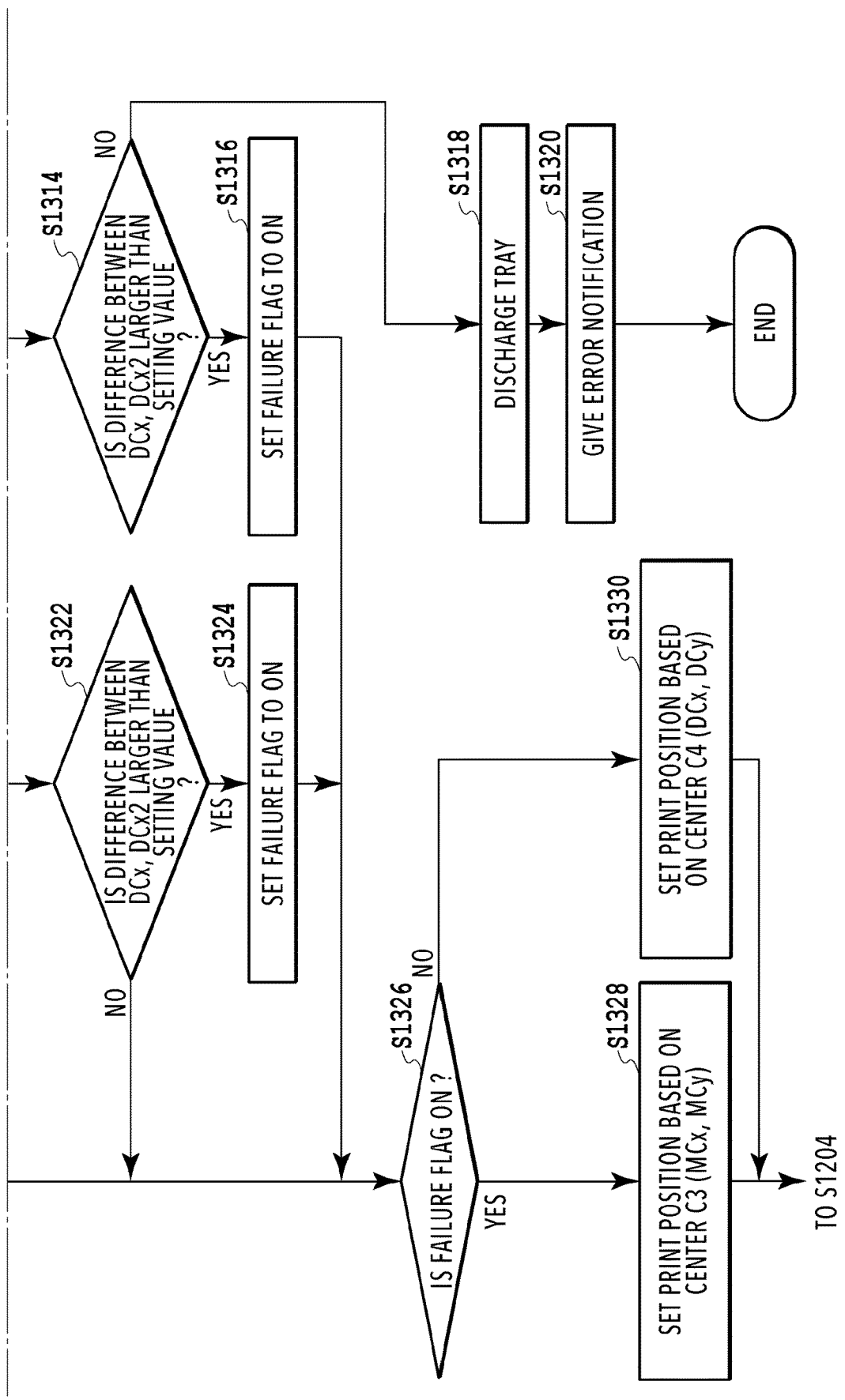

FIGS. 13A and 13B are flowcharts illustrating the process routine of the first setting process which is a subroutine of the first process. In the first setting process at S1202, a print position is set based on the center C3 of the optical disk D calculated from the positions of the first reflecting portion 158*a* and the second reflecting portion 158*b* or the center C4 of the optical disk D obtained by detecting the hole DH of the optical disk D.

In the first setting process, first the center C3 (MCx, MCy) of the optical disk D is calculated from the center C1 of the first reflecting portion 158*a* and the center C2 of the second reflecting portion 158*b* (S1302). For example, the controller 100 has a formula stored therein for calculating the center C3 of the optical disk D held by the tray 12 based on the center C1 of the first reflecting portion 158*a* and the center C2 of the second reflecting portion 158*b*. Thus, at S1302, the center C3 (MCx, MCy) of the optical disk D is calculated based on this formula.

Figure 14:
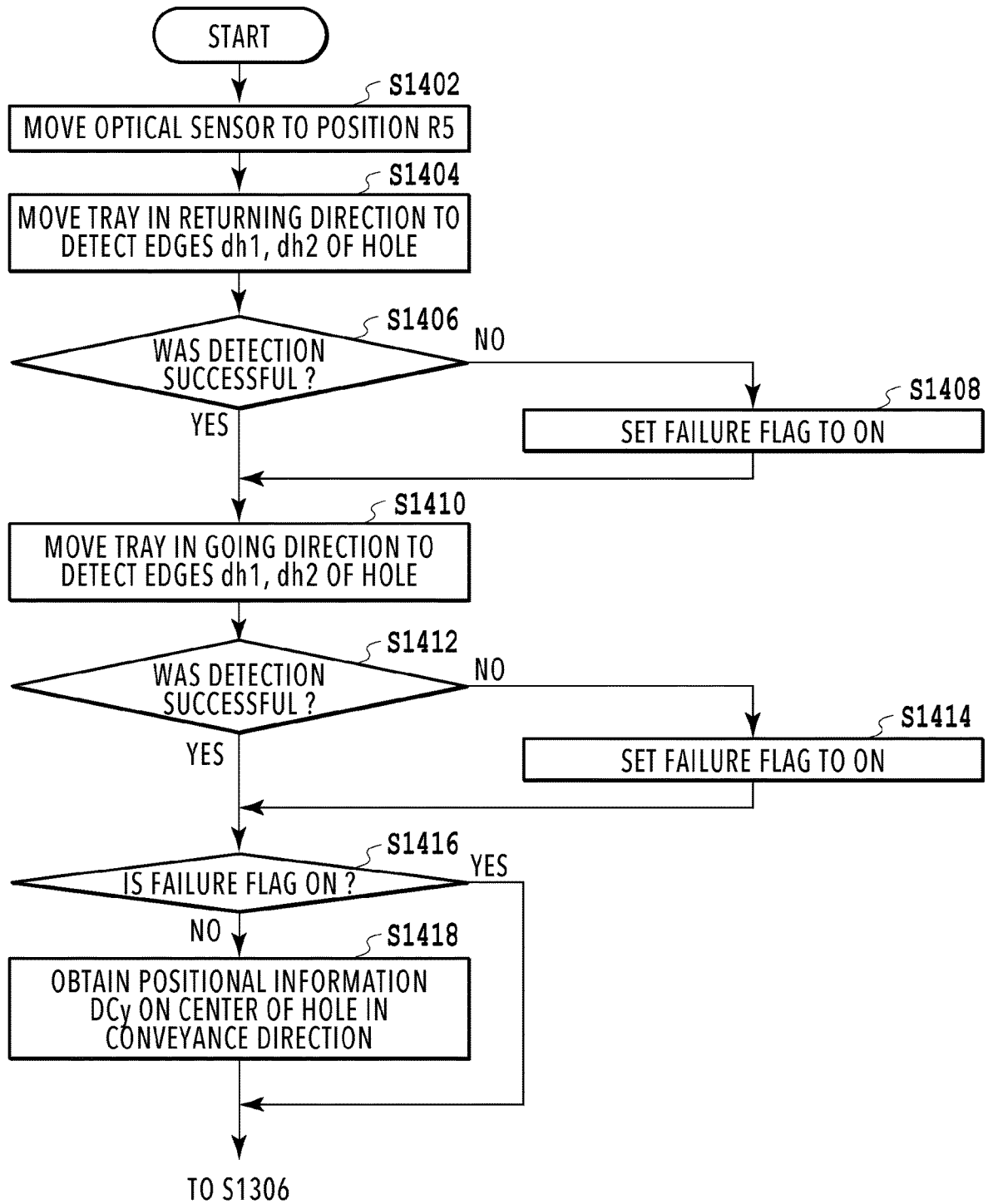
FIG. 14 is a flowchart illustrating the process routine of a third obtaining process.
Figure 15A:
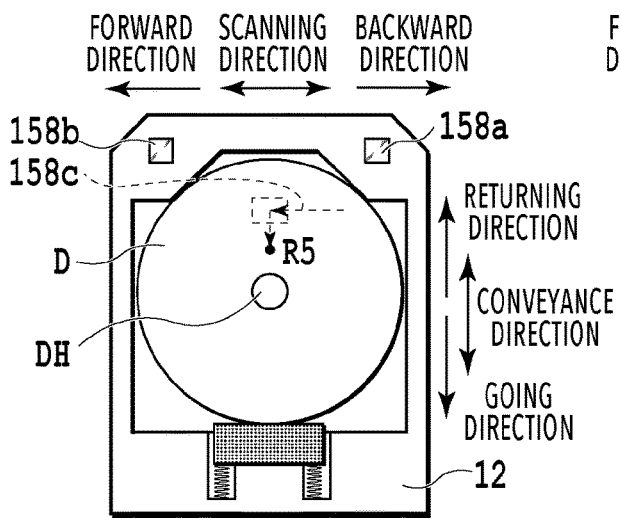
FIGS. 15A, 15B, 15C, 15D, and 15E are diagrams illustrating relative moving directions of the optical sensor in detecting a hole.
Figure 15B:
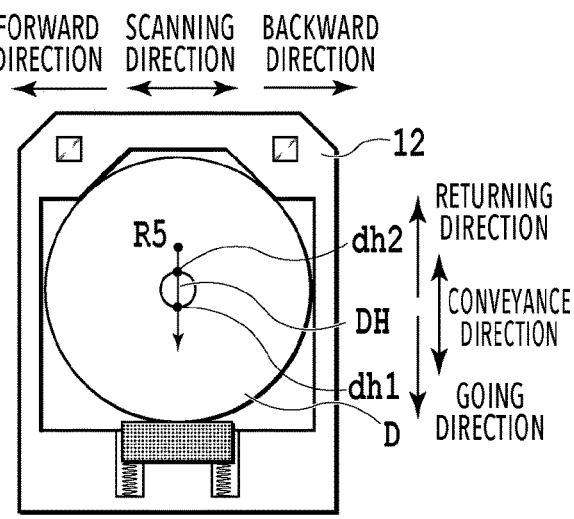
Figure 15C:
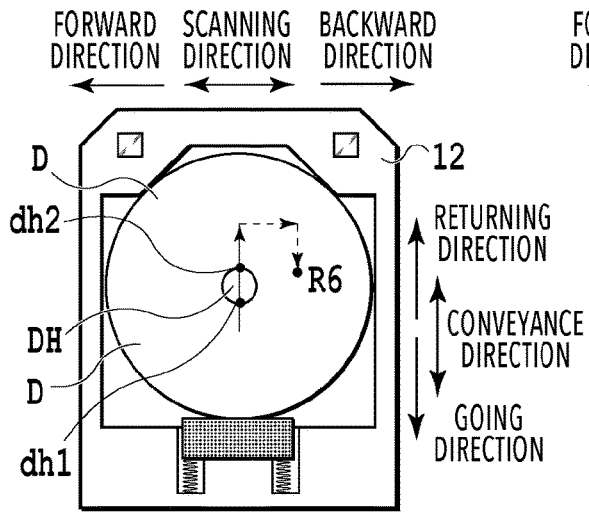
Figure 15D:
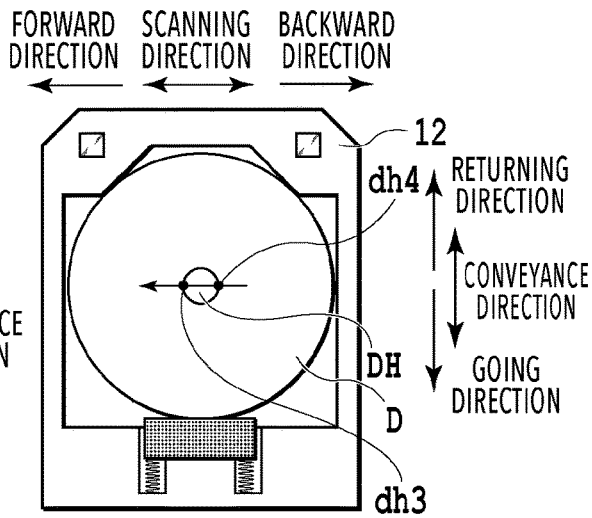
Figure 15E:
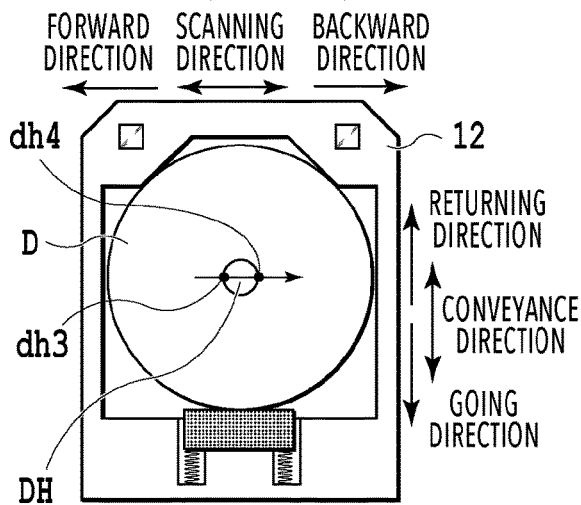
Figure 16A:
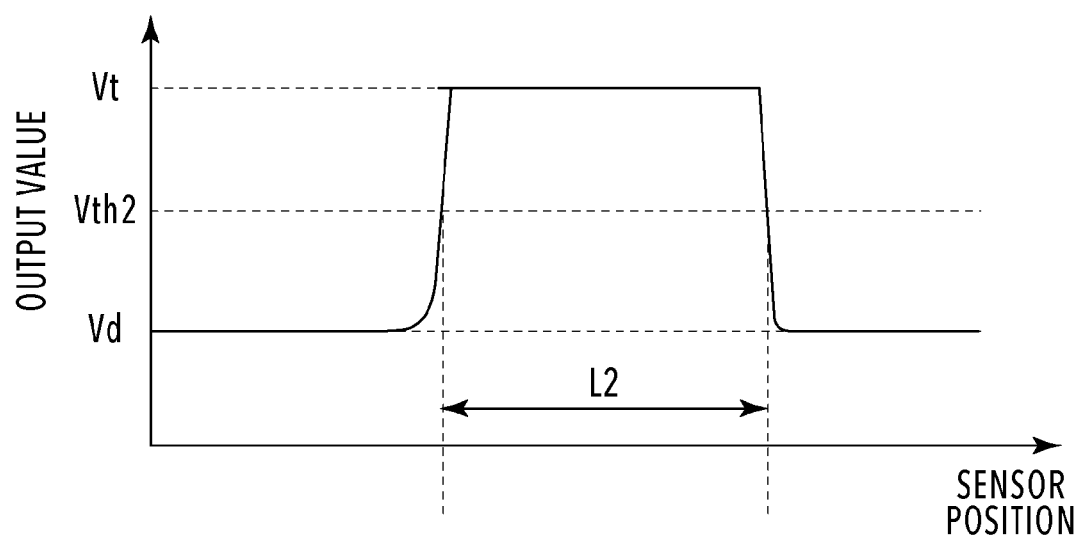
FIGS. 16A and 16B are diagrams for explaining detection of the hole.
Figure 16B:
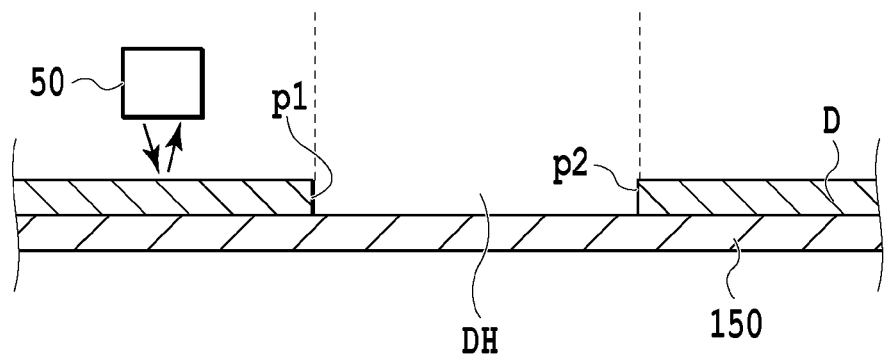

Next, a third obtaining process is performed for obtaining the center in the conveyance direction of the hole DH which is located at the center of the optical disk D and into which a spindle is inserted (S1304). Here, FIG. 14 is a flowchart illustrating a detailed process routine of the third obtaining process at S1304. FIG. 15A is a diagram illustrating a relative movement path of the optical sensor 50 to get to the position R5. FIG. 15B is a diagram illustrating the relative moving direction of the optical sensor 50 and the edges dh1 and dh2 of the hole DH to be detected for the case where the tray 12 is conveyed in the returning direction. FIG. 15C is a diagram illustrating the relative moving direction of the optical sensor and the edges dh1 and dh2 of the hole DH to be detected for the case when the tray 12 is conveyed in the going direction. FIG. 15D is a diagram illustrating the moving direction of the optical sensor 50 and the edges dh3 and dh4 of the hole DH to be detected for the case where the carriage 32 is moved in the forward direction. FIG. 15E is a diagram illustrating the moving direction of the optical sensor 50 and the edges dh3 and dh4 of the hole DH to be detected for the case where the carriage 32 is moved in the backward direction. FIG. 16A is a graph illustrating change in the output value of the optical sensor 50 relative to its position. FIG. 16B is a cross-sectional view of the hole DH and its periphery corresponding to the position of the optical sensor 50 illustrated in FIG. 16A.

In the third obtaining process at S1304, first the optical sensor 50 is moved to the position R5 (S1402). Specifically, at S1402, first the carriage 32 is moved in the forward direction to position the optical sensor 50 on the line of the positional information MCx which is the center of the optical disk D in the scanning direction calculated at S1302. Next, the tray 12 is conveyed in the returning direction to position the optical sensor 50 at the position R5 which is upstream of the hole DH in the conveyance direction by a specified distance (see FIG. 15A).

Next, while the tray 12 is being conveyed in the returning direction, the optical sensor 50 detects the edges dh1 and dh2 of the hole DH in the optical disk D (S1404). Specifically, at S1404, the optical sensor 50 is moved relative to the optical disk D in the going direction such that the optical sensor 50 passes over the hole DH.

Here, the tray 12 (the recess 150) is seen inside the hole DH when viewed from the movement path of the optical sensor 50. The recess 150 is adapted to reflect a less amount of light emitted by the optical sensor 50 than the surface of the optical disk D (the surface to be printed on). Hence, the optical sensor 50 receives a less amount of light and thus the output value from the optical sensor 50 is larger when detecting the hole D than when detecting the surface of the optical disk D. Thus, to detect the hole DH, it is determined whether the output value of the optical sensor 50 is a threshold Vth2 or more as illustrated in FIG. 16A. Then, the positions where the output value becomes more than or equal to the threshold Vth2 are detected as the positional information (coordinate values) indicating the edges p1 and p2 of the hole DH. Note that when the hole DH is detected, the length L2 between both detected edges is also obtained.

Thus, at S1404 (S1410 described later), the length between the edges dh1 and dh2 is obtained in addition to the edges dh1 and dh2. At S1404, the positional information on the edge dh2 in the conveyance direction is obtained when the detection point of the optical sensor 50 enters the hole DH. The positional information on the edge dh1 in the conveyance direction is obtained when the detection point of the optical sensor 50 gets out of the hole DH (see FIG. 15B).

After that, it is determined whether the edges dh1 and dh2 were able to be detected (S1406). Specifically, it is determined at S1406 that the detection was successful in the case where the edges dh1 and dh2 were detected, and also the length between the edges dh1 and dh2 is within a specified range. In the case where at least one of the edges dh1 and dh2 was not able to be detected, or in the case where even though the edges dh1 and dh2 were able to be detected, the length is not within the specified range, and it is determined that the detection failed.

If it is determined at S1406 that the detection failed, the failure flag is set to ON (S1408), and the process proceeds to S1410 described later. If it is determined at S1406 that the detection was successful, the optical sensor 50 detects the edges dh1 and dh2 of the hole DH while the tray 12 is being conveyed in the going direction (S1410). Specifically, at S1410, the optical sensor 50 moves relative to the optical disk D in the returning direction such that the optical sensor 50 passes over the hole DH. At S1410, the positional information on the edge dh1 in the conveyance direction is obtained when the detection point of the optical sensor 50 enters the hole DH. The positional information on the edge dh2 in the conveyance direction is obtained when the detection point of the optical sensor 50 gets out of the hole DH (see FIG. 15C).

Next, it is determined whether the edges dh1 and dh2 were able to be detected (S1412). Note that the concrete process details of S1412 are the same as those of S1406, and thus description thereof is omitted. If it is determined at S1412 that the detection of the edges dh1 and dh2 failed, the failure flag is set to ON (S1414), and the process proceeds to S1416 described later. If it is determined at S1412 that the detection was successful, it is determined whether the failure flag is ON (S1416).

If the failure flag is ON at S1416, the process proceeds to S1306 described later. If the failure flag is not ON at S1416, the positional information DCy on the center of the hole DH in the conveyance direction is obtained, using the positional information on the edge dh1 detected at S1404 and the edge dh2 detected at S1410 (S1418). In other words, at S1418, the midpoint between the positional information on the edge dh1 and the positional information on the edge dh2, detected when the detection point of the optical sensor 50 gets out of the hole DH, is obtained as positional information DCy on the center of the hole DH in the conveyance direction. This positional information DCy is the positional information on the center of the hole DH (in other words, the center C4 of the optical disk D) in the scanning direction. Note that as explained on the detection of the reflecting portion 158, also in detecting the hole DH, systematic discrepancy occurs in the positional information depending on the relative moving direction of the optical sensor 50. Thus, the positional information obtained when the detection point of the optical sensor 50 gets out of the hole DH is used to obtain the center of the hole DH.

Figure 17:
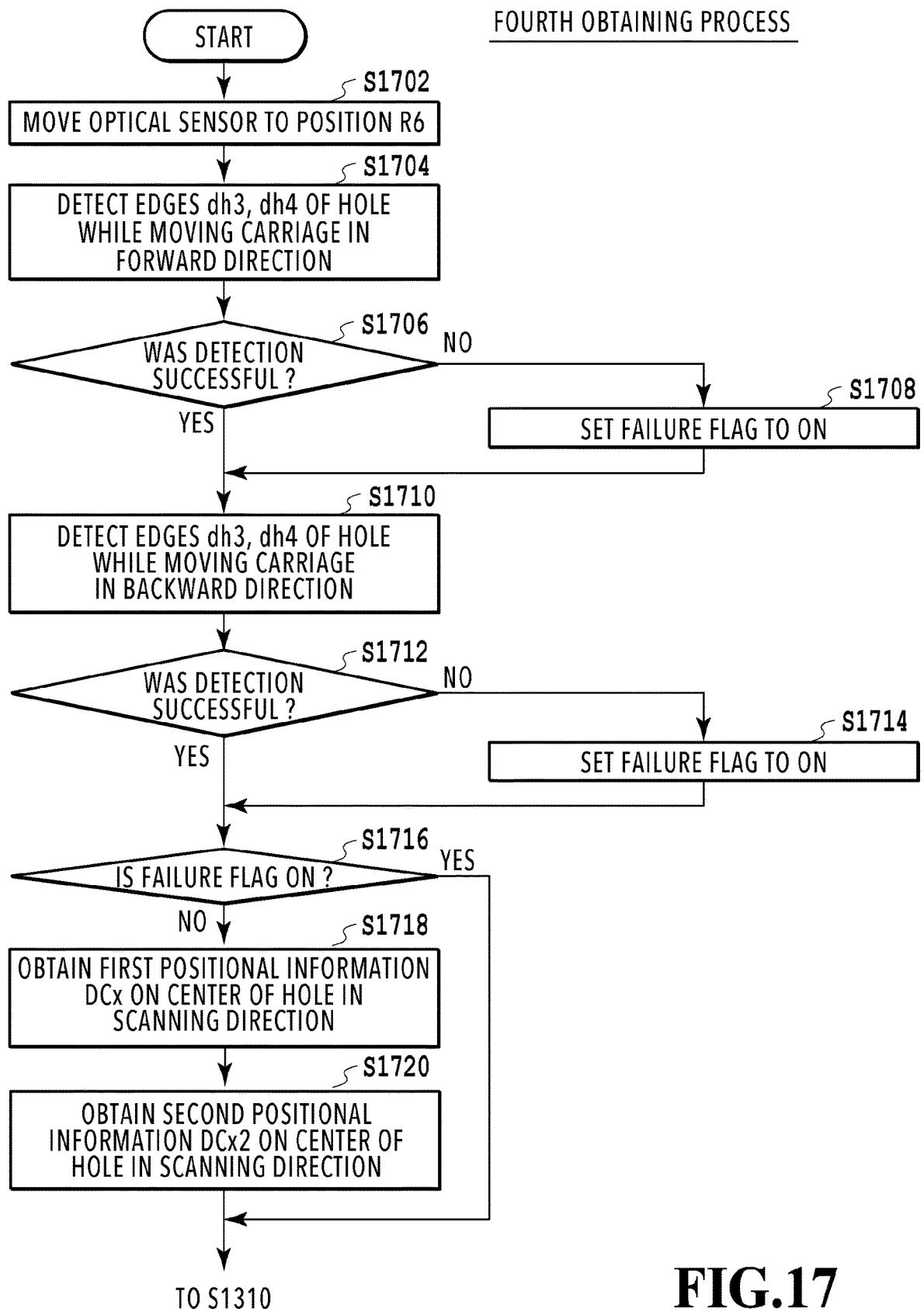
FIG. 17 is a flowchart illustrating the process routine of a fourth obtaining process.

Returning to FIG. 13A, after the positional information DCy on the center of the hole DH in the conveyance direction is obtained in the third obtaining process, next a fourth obtaining process is performed for obtaining the center of the hole DH in the scanning direction (S1306). Here, FIG. 17 is a flowchart illustrating a detailed process routine of the fourth obtaining process at S1306.

In this fourth obtaining process, first the optical sensor 50 is moved to the position R6 (S1702). In other words, at S1702, first the carriage 32 is moved in the backward direction by a moving distance set in advance. Then, the tray 12 is conveyed in the returning direction to move the optical sensor 50 to a position on the line indicated by the positional information DCy which is the center of the hole DH in the scanning direction. With this operation, the optical sensor 50 is positioned at the position R6, which is a specified distance away from the hole DH in the scanning direction (see FIG. 15C). Note that in the case where the failure flag is ON, the positional information MCy obtained at S1302 is used as the center of the hole DH in the scanning direction.

Next, while the carriage 32 is being moved in the forward direction, the optical sensor 50 detects the edges dh3 and dh4 of the hole DH (S1704). Specifically, at S1704, the optical sensor 50 moves relative to the optical disk D in the forward direction such that the optical sensor 50 passes over the hole DH. At S1704 (at S1710 described later), the length between the edges dh3 and dh4 is obtained in addition to the edges dh3 and dh4. At S1704, the positional information on the edge dh4 in the scanning direction is obtained when the detection point of the optical sensor 50 enters the hole DH. The positional information on the edge dh3 in the scanning direction is obtained when the detection point of the optical sensor 50 gets out of the hole DH (see FIG. 15D).

After that, it is determined whether the edges dh3 and dh4 were able to be detected (S1706). Specifically, it is determined at S1706 that the detection was successful in the case where the edges dh3 and dh4 were detected, and also the length between the edges dh3 and dh4 is within a specified range. In the case where at least one of the edges dh3 and dh4 was not able to be detected, or in the case where even though the edges dh3 and dh4 were able to be detected, but the length is not within the specified range, it is determined that the detection failed.

If it is determined at S1706 that the detection failed, the failure flag is set to ON (S1708), and the process proceeds to S1710 described later. If it is determined at S1706 that the detection was successful, the optical sensor 50 detects the edges dh3 and dh4 of the hole DH while the carriage 32 is being moved in the backward direction (S1710). Specifically, at S1710, the optical sensor 50 moves relative to the optical disk D in the backward direction such that the optical sensor 50 passes over the hole DH. At S1710, the positional information on the edge dh3 in the scanning direction is obtained when the detection point of the optical sensor 50 enters the hole DH. The positional information on the edge dh4 in the scanning direction is obtained when the detection point of the optical sensor 50 gets out of the hole DH (see FIG. 15E).

Next, it is determined whether the edges dh3 and dh4 were able to be detected (S1712). Note that the concrete process details of S1712 are the same as those of S1706, and thus description thereof is omitted. If it is determined at S1712 that the detection of the edges dh3 and dh4 failed, the failure flag is set to ON (S1714), and the process proceeds to S1716 described later. If it is determined at S1712 that the detection was successful, it is determined whether the failure flag is ON (S1716).

If the failure flag is ON at S1716, the process proceeds to S1310 described later. If the failure flag is not ON at S1716, the first positional information DCx on the center of the hole DH in the scanning direction is obtained, using the positional information on the edge dh3 detected at S1704 and the edge dh4 detected at S1710 (S1718). In other words, at S1718, the midpoint between the positional information on the edge dh3 and the positional information on the edge dh4, detected when the detection point of the optical sensor 50 gets out of the hole DH is obtained as first positional information DCx on the center of the hole DH in the scanning direction. This first positional information DCx is the positional information on the center of the hole DH (in other words, the center C4 of the optical disk D) in the scanning direction.

In addition, second positional information DCx2 on the center of the hole DH in the scanning direction is obtained, using the positional information on the edge dh4 detected at S1704 and the edge dh3 detected at S1710 (S1720). In other words, at S1720, the midpoint between the positional information on the edge dh4 and the positional information on the edge dh3, detected when the detection point of the optical sensor 50 gets enters the hole DH is obtained as the second positional information DCx2 on the center of the hole DH in the scanning direction. The center of the hole DH in the conveyance direction and in the scanning direction obtained in this third obtaining process and the fourth obtaining process is regarded as the center C4 of the optical disk D based on the edges of the hole DH.

Returning to FIG. 13A, after the positional information DCx, DCx2 on the center of the hole DH in the scanning direction is obtained in the fourth obtaining process, next it is determined whether at least one of the positional information piece DCx in the scanning direction of the center C4 of the optical disk D (the center of the hole DH) and the positional information piece DCy in the conveyance direction has been obtained (S1308). If it is determined at S1308 that either of the positional information piece DCx or DCy has not been obtained, the process proceeds to S1326 described later. If it is determined at S1308 that at least one of the positional information pieces DCx and DCy has been obtained, the center C3 (MCx, MCy) of the optical disk D and the center C4 (DCx, DCy) of the optical disk D are compared to each other (S1310). Note that the center C4 of the optical disk D is based on the positional information on the center of the hole DH in the conveyance direction obtained at S1304 and the positional information on the center of the hole DH in the scanning direction obtained at S1306.

In other words, at S1310, it is determined whether the difference |DCx−MCx| (a first difference) in the positional information in the scanning direction is larger than a first setting value, and it is also determined whether the difference |DCy×MCy| (a second difference) in the positional information in the conveyance direction is larger than a second setting value. Note that in the case where one of the positional information pieces DCx and DCy has not been obtained, it is only determined whether the obtained positional information piece is larger than the corresponding setting value. The process details of this S1310 (S1312) will be described later.

Next, it is determined whether at least one of the difference in the positional information in the scanning direction and the difference in the positional information in the conveyance direction is larger than the corresponding setting value (S1312). In other words, at S1312, it is determined whether the optical disk D is properly held by the tray 12. Specifically, in the case where it is determined that at least one of the difference in the positional information in the scanning direction and the difference in the positional information in the conveyance direction is larger than the corresponding setting value, it is determined that the optical disk D is not properly held by the tray 12.

If it is determined at S1312 that at least one of the difference in the positional information in the scanning direction and the difference in the positional information in the conveyance direction is larger than the corresponding setting value, it is determined whether the difference between the first positional information DCx and the second positional information DCx2 is larger than a third setting value (S1314). In other words, at S1314, it is determined whether |DCx−DCx2| is larger than the third setting value (specified value).

If it is determined at S1314 that the difference between the first positional information DCx and the second positional information DCx2 is larger than the third setting value, the failure flag is set to ON (S1316), and the process proceeds to S1326 described later. If it is determined at S1314 that the difference between the first positional information DCx and the second positional information DCx2 is smaller than or equal to the third setting value, it is judged that the optical disk D is not held by the tray 12, and the tray 12 is discharged (S1318). Then, an error message indicating that the optical disk D is not held by the tray 12 is shown to the user (S1320), and this first setting process ends, which finishes the printing process.

On the other hand, if it is determined at S1312 that both of the difference in the positional information in the scanning direction and the difference in the positional information in the conveyance direction is smaller than the respective setting values, it is determined whether the difference between the first positional information DCx and the second positional information DCx2 is larger than the third setting value (S1322). Note that the process at S1322 is the same as that at S1314. If it is determined at S1322 that the difference between the first positional information DCx and the second positional information DCx2 is larger than the third setting value, the failure flag is set to ON (S1324), and the process proceeds to S1326 described later. If it is determined at S1322 that the difference between the first positional information DCx and the second positional information DCx2 is smaller than or equal to the third setting value, the process proceeds to S1326 described later.

At S1326, it is determined whether the failure flag is ON. If it is determined at S1326 that the failure flag is ON, the print position is set based on the center C3 (MCx, MCy) of the optical disk D calculated at S1302 (S1328). If it is determined at S1326 that the failure flag is not ON, the center of the hole DH based on the positional information obtained at S1304 and S1306 is used as the center of the optical disk D, the print position is set based on the center C4 (DCx, DCy) (S1330).

The setting of the print position based on the center C3 or C4 of the optical disk is executed by the controller 100. In addition, the comparison between the centers C3 and C4 of the optical disk and the determination concerning them (S1310, S1312), the determination concerning the first positional information DCx and the second positional information DCx2 (S1314, S1322), the determination concerning the failure flag (S1326), and the like are executed by the controller 100.

Meanwhile, in a case where the center C3 of the optical disk D is calculated from the centers of the reflecting portions 158, the center C3 may include some positional error from the center of the optical disk D actually held by the tray 12, due to the influence of the dimensional tolerance from the reflecting portions 158 to the abutment portions 154, the outer diameter tolerance of the optical disk D, and other factors. In contrast, in the present embodiment, the center C4 of the optical disk D is calculated as the center of the hole DH.

Obtaining the center of the hole DH based on the detection results by the optical sensor 50 eliminates the influence of the outer diameter tolerance of the optical disk D and the tolerance from the reflecting portions 158 to the abutment portions 154. In addition, in the optical disk D, the dimensional accuracy in the diameter of the hole DH is higher than that in the outer diameter of the optical disk D. In addition, since the optical disk D is configured such that a spindle is inserted into the hole DH and the rotation of the spindle rotates the optical disk D, the hole DH is formed such that the center of the hole DH agrees with the center of the optical disk D with high accuracy.

Thus, the center of the hole DH has a less positional error from the center of the optical disk D held by the tray 12 than the center C3 of the optical disk D based on the reflecting portions 158 or the center of the optical disk D calculated from the outer circumference. In the embodiment of the present application, the print position is set using the center of the hole DH described above as the center C4 of the optical disk D to prevent a positional error in printing.

Further, in the present embodiment, the center of the hole DH is obtained by the optical sensor 50 scanning over the hole DH having a small diameter in two directions intersecting each other. With this operation, the time taken to obtain the center of the optical disk D can be shorter than in the case where the center of the optical disk is obtained by a sensor scanning the whole optical disk having a large diameter in two directions intersecting each other to detect the outer circumference of the optical disk D.

Figure 18:
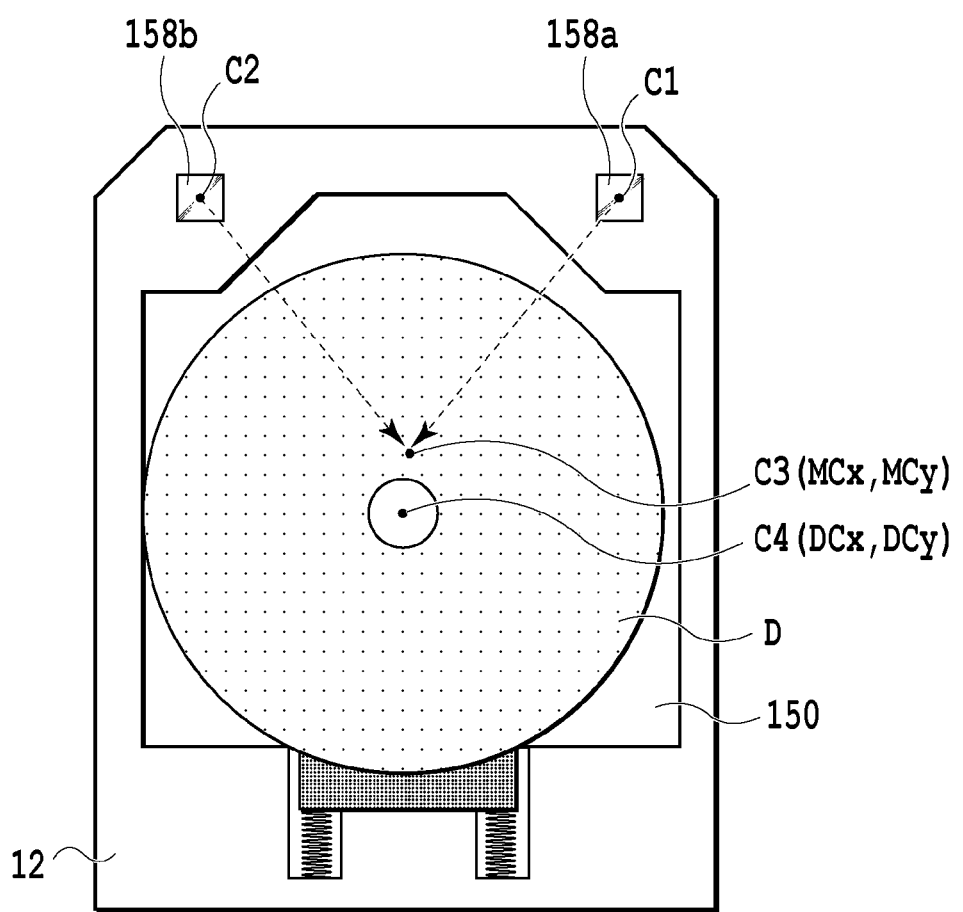
FIG. 18 is a diagram illustrating the tray incorrectly holding an optical disk.

In addition, for example, in the case where the optical disk D is not properly held by the tray 12 as illustrated in FIG. 18, the center C4 of the optical disk D based on the hole DH is largely shifted from the center C3 of the optical disk D based on the reflecting portions 158. Thus, in the first setting process, it is determined at S1312 whether the difference |DCx−MCx| in the positional information in the scanning direction is larger than the first setting value, and it is also determined whether the difference |DCy−MCy| in the positional information in the conveyance direction is larger than the second setting value. Then, in the case where at least one of the differences is larger than the corresponding setting value, it is determined that there is a large positional difference between the center C4 and the center C3, and printing finishes via the process at S1314, or the print position is set based on the center C3. This operation prevents a positional error in printing onto an optical disk D not properly held by the tray 12 and also prevents printing onto the tray 12. Note that the first setting value and the second setting value are set, for example, to values larger by specified values than the maximum values of the displacement of the center C4 (DCx, DCy) relative to the center C3 (MCx, MCy) in the case where the optical disk D is properly held.

In the present embodiment, as illustrated in FIGS. 5A and 5B, the second driven rollers 28 are located one on each side in the scanning direction of the recess 150, which holds the optical disk D, so as to adjoin the recess 150. Consequently, even if an optical disk D is not properly held by the tray 12, the position of the optical disk D in the scanning direction is regulated by the second driven rollers 28. Thus, the present embodiment has an apparatus configuration in which even an optical disk D not properly held by the tray 12 is not easily displaced in the scanning direction compared to in the conveyance direction.

For this reason, in detecting the edges of the hole DH, the optical sensor 50 is first moved relative to the optical disk D in the conveyance direction to detect edges, and then, the optical sensor 50 is moved in the scanning direction to detect edges. In the case of detecting the edges of the hole DH by moving the optical sensor 50 in the conveyance direction, first the position of the optical sensor 50 needs to be adjusted to agree with the position of the hole DH in the scanning direction in which the amount of the positional error is relatively small. In this case, the positions of the optical sensor 50 and the hole DH can be easily adjusted in the scanning direction. In contrast, in the case of detecting the edges of the hole DH by moving the optical sensor 50 in the scanning direction, first the position of the optical sensor 50 needs to be adjusted to agree with the position of the hole DH in the conveyance direction in which the amount of the positional error is relatively large. In this case, adjusting the positions of the optical sensor 50 and the hole DH in the conveyance direction is more difficult. Thus, in the case where the edges of the hole DH in the conveyance direction are detected first, and then the edges of the hole DH in the scanning direction are detected, the edges of the hole DH can be detected more reliably than in the case where the order of the detections is opposite.

Meanwhile, depending on the types of optical disks D, the amount of reflection around the hole DH of the light emitted from the optical sensor 50 is small in some optical disks D. For such optical disks D, since the amount of light reflected on portions around the hole DH and the amount of light reflected on the recess 150 in the hole DH do not have much difference, there is a possibility that the edges of the hole DH cannot be detected accurately. If the print position is set using the center C4 of the optical disk D obtained based on the edges of the hole DH not accurately detected, a positional error in printing would occur. In the first setting process, in the case where the edges of the hole DH are not accurately detected, the failure flag is set to ON, and thus, in the case where the detection is successful, the failure flag is not set to ON. Thus, in the first setting process, if it is determined at S1326 that the failure flag is ON, the print position is set using the center C3 of the optical disk D calculated from the centers of the reflecting portions 158. This operation enables the printing apparatus 10 to perform printing while preventing fairly a positional error in printing even for an optical disk D the edges of the hole DH of which cannot be accurately detected.

Figure 19A:
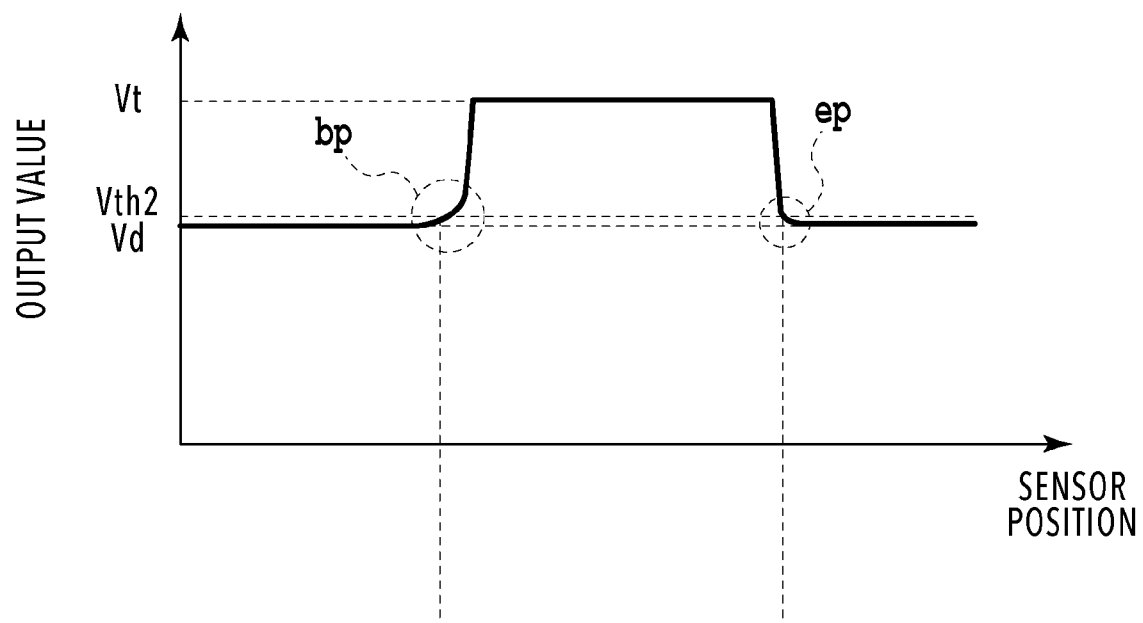
FIGS. 19A and 19B are diagrams for explaining incorrect detection of the hole.
Figure 19B:
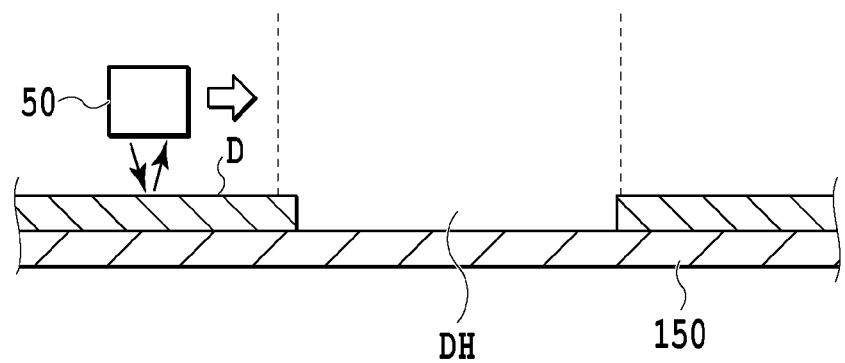

Hereinafter, accuracy in detection of the edges of the hole DH will be described in detail. FIG. 19 is a graph illustrating change in the output value of the optical sensor 50 relative to its position, for an optical disk having a less reflectance. FIG. 19B is a cross-sectional view of the hole DH and its periphery corresponding to the position of the optical sensor 50 illustrated in FIG. 19A.

Depending on the types of optical disks D, the amount of reflection around the hole DH of the light emitted from the optical sensor 50 may be small, and there is a possibility that the output value of the optical sensor 50 is around the threshold Vth2 as illustrated in FIGS. 19A and 19B. Note that in the case where the output value does not become the threshold Vth2 or more during the movement of the optical sensor 50, the detection is regarded as a failure. In the case where the output value barely becomes Vth2 or more as illustrated in FIGS. 19A and 19B, there is a high possibility that the detected edges of the hole DH have low accuracy. This is because in the graph, the portion bp where the output value starts to rise and the portion ep where it finishes falling are bluntly curved. Consequently, in a case where the output value at the time when the surroundings of the hole DH are detected is close to the threshold Vth2, the point where the output value becomes the threshold Vth2 or more may be incorrectly detected. The print position set based on the center of the hole DH (the center C4 of the optical disk D) obtained using the values thus incorrectly detected may cause a positional error in printing.

In the first setting process, the processes S1314 and S1322 are performed to determine the detection accuracy of the edges of the hole DH. The first positional information DCx is obtained based on the edges obtained when the detection point of the optical sensor 50 gets out of the hole DH, and the second positional information DCx2 is obtained based on the edges obtained when the detection point of the optical sensor 50 enters the hole DH. In the case where the edge detection accuracy is low, in other words, in the case where the edges of the hole DH are incorrectly detected, the difference between the first positional information DCx and the second positional information DCx2 is large. Thus, in the case where this difference is smaller than or equal to a specified value (third setting value), in other words, in the case where the first positional information DCx and the second positional information DCx2 are close to each other, it can be determined that the edges were accurately detected. On the other hand, in the case where the difference is more than the specified value, it can be determined that the edges were not accurately detected.

At S1314, since it has been determined at the preceding process S1312 that the optical disk D is not properly held by the tray 12, it is determined from another viewpoint whether the optical disk D is incorrectly held by the tray 12. Specifically, in the case where the difference between the first positional information DCx and the second positional information DCx2 is less than or equal to the third setting value, it is determined that the edge detection accuracy is high, and thus it can be determined, as determined at S1312, that the optical disk D is incorrectly held. On the other hand, in the case where the difference between the first positional information DCx and the second positional information DCx2 is more than the third setting value, it is considered that the edge detection accuracy is low. This implies a possibility that the optical disk D is not incorrectly held by the tray 12. Thus, with the determination at S1314, an error judgment is not made, but the failure flag is set to ON, and the succeeding process is executed.

Second Process

Figure 20:
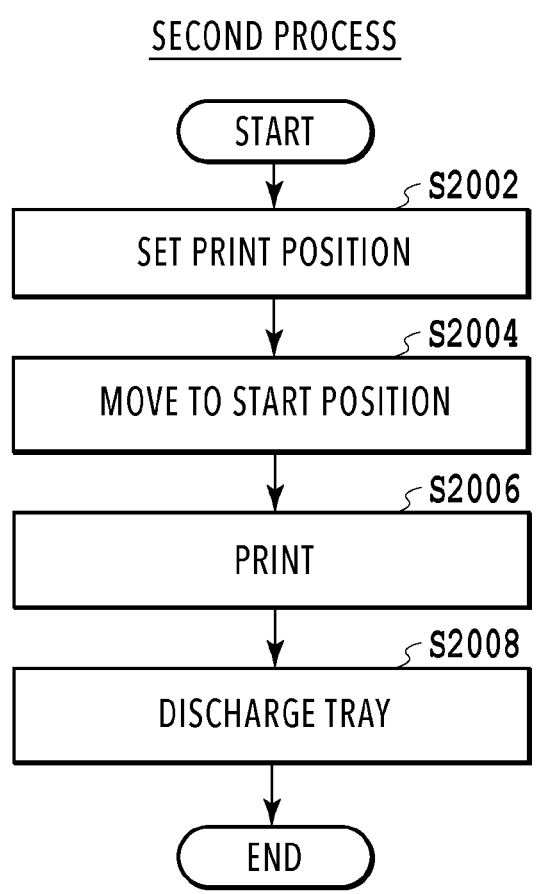
FIG. 20 is a flowchart illustrating the process routine of a second process.

FIG. 20 is a flowchart illustrating the process routine of the second process. In the second process at S634, first the print position is set for each nail sticker Ns placed on the nail-sticker mount NM, based on the first reflecting portion 158*a* and the second reflecting portion 158*b* (S2002). In other words, the print position for each nail sticker Ns is calculated and set based on the center C1 of the first reflecting portion 158*a* obtained in the first obtaining process and the center C2 of the second reflecting portion 158*b* obtained in the second obtaining process.

The nail stickers Ns are held on the nail-sticker mount NM made of a resin material in a plate shape, and the spaces between the nail stickers Ns are relatively large. Thus, the permissible range of a positional error in printing is set larger than in the case of printing on optical disks D or cards Cd.

For this reason, for printing on nail stickers Ns, each nail sticker Ns is not detected, but the print position is set for each nail sticker Ns based on the center C1 of the first reflecting portion 158a and the center C2 of the second reflecting portion 158b. With this operation, although a positional error in printing occurs due to factors such as the tolerance of the dimensions from the center C1 of the first reflecting portion 158a and the center C2 of the second reflecting portion 158b to the abutment portions 154c and 154d in the tray 12, the degree of the positional error in printing is within the permissible range. Since operation for detecting the nail stickers Ns is not performed, the time taken before printing start is shorter than in the case of optical disks D and cards Cd described later.

Next, the tray 12 is conveyed to the print start position based on the set print position (S2004), the position of the print head 34 of the carriage 32 is adjusted to the position of a nail sticker Ns, and printing starts (S2006). When the printing ends, the tray 12 is discharged to the outside of the apparatus (S2008), and this second process ends, which finishes the printing process.

Third Process

Figure 21:
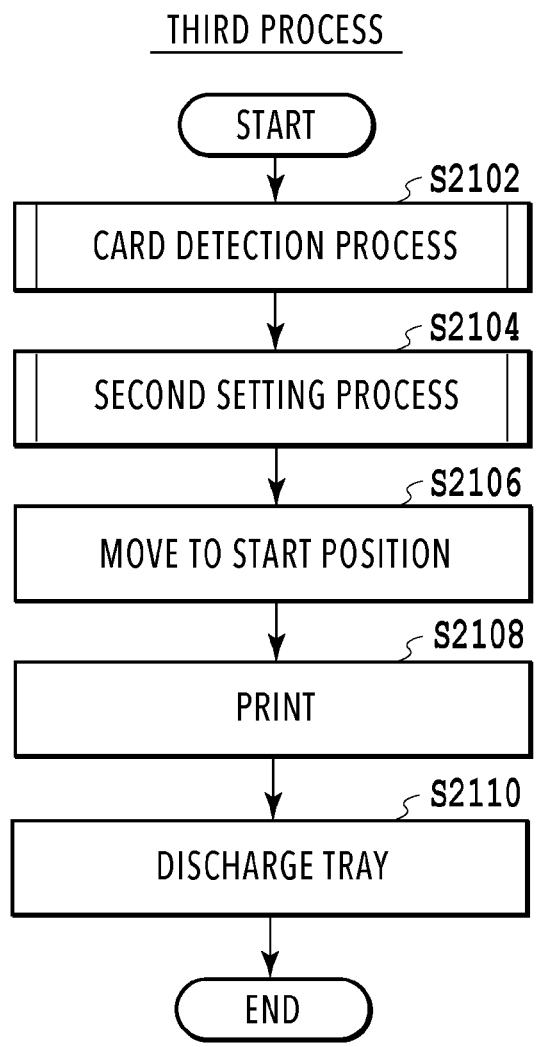
FIG. 21 is a flowchart illustrating the process routine of a third process.

FIG. 21 is a flowchart illustrating the process routine of the third process. In the third process at S636, first a card detection process is performed for determining whether cards Cd are set (held) on a card mount CM (S2102). In the case where cards Cd are detected in the card detection process, a second setting process is performed for setting the print start positions for the cards Cd set on the card mount CM (S2104). Note that the card detection process at S2102 and the second setting process at S2104 will be described later.

On the card mount CM, the first fitting portion 160 and the second fitting portion 162, in each of which a card Cd can be set, are formed side by side in the scanning direction as described early, and the space in between is small. For this reason, the permissible range of a positional error in the scanning direction in printing on the cards Cd set in the fitting portions is set small. For the card mount CM, the permissible range of a positional error in printing is set larger in the conveyance direction than in the scanning direction.

Next, the tray 12 is conveyed to the print start position based on the set print position (S2106), the position of the print head 34 of the carriage 32 is adjusted to the position of a card Cd, and printing starts (S2108). When the printing ends, the tray 12 is discharged to the outside of the apparatus (S2110), and this third process ends, which finishes the printing process.

Figure 22:
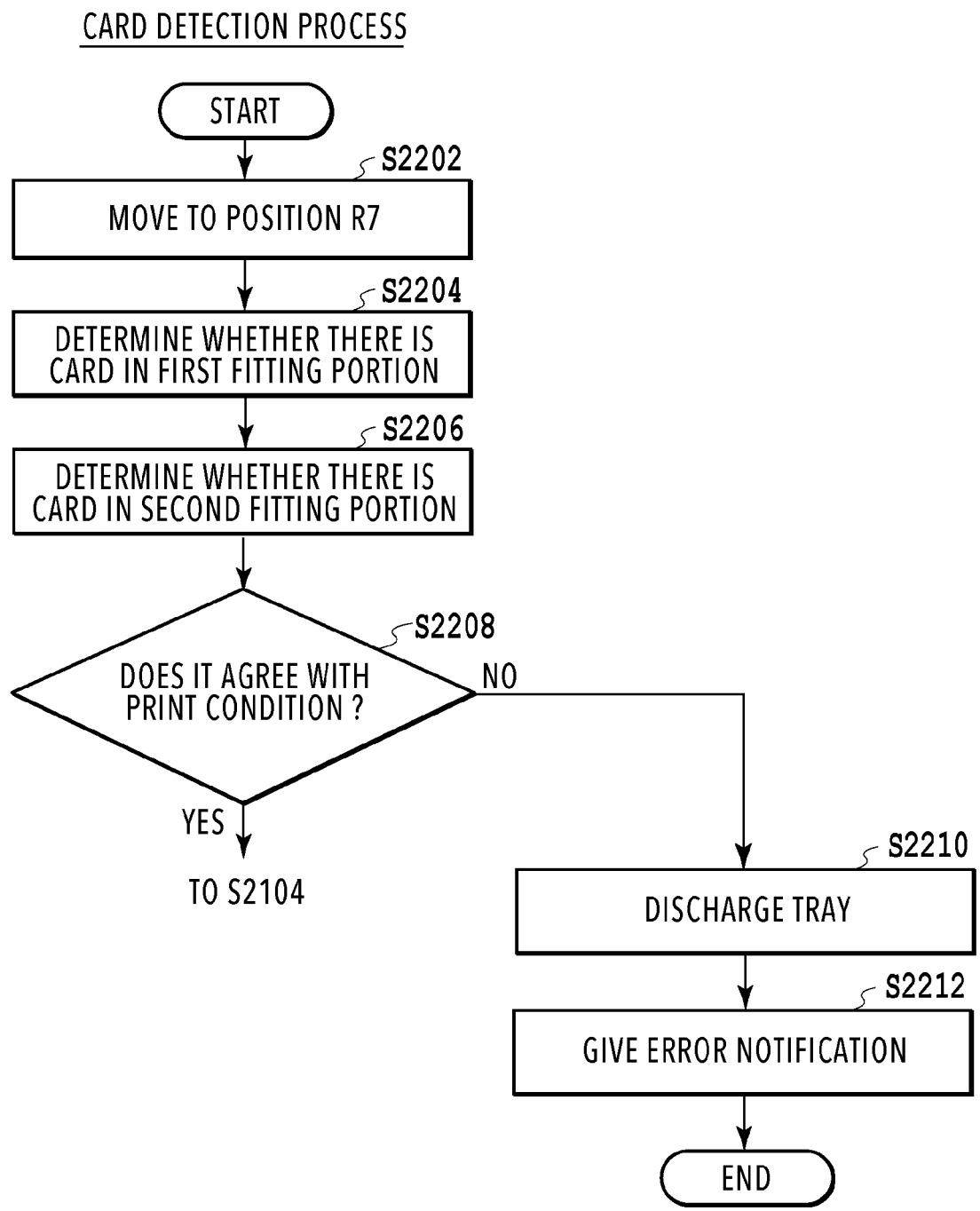
FIG. 22 is a flowchart illustrating the process routine of a card detection process.

FIG. 22 is a flowchart illustrating the process routine of the card detection process which is a subroutine of the third process. FIG. 23A is a diagram illustrating the relative moving direction of the optical sensor 50 during the card detection process.

The card detection process at S2102 is for detecting whether cards Cd are set on the card mount CM in the manner that agrees with the print conditions. Note that in the card detection process, the presence of a card in each fitting portion is detected by detecting the detection hole 160a of the first fitting portion 160 and the detection hole 162a of the second fitting portion 162. The surfaces of the card Cd and the card mount CM (the surfaces facing the optical sensor 50) are adapted to have higher reflectances than the tray 12 (excluding the reflecting portions 158) by a specified degree or more. For example, the surfaces of the card Cd and the card mount CM are white, and the tray 12 is black.

In the card detection process, first the optical sensor 50 is positioned at the position R7 set in advance, based on the center C1 of the first reflecting portion 158a and the center C2 of the second reflecting portion 158b (S2202). The position R7 is approximately in agreement with the center of the detection hole 160a in the scanning direction and is located upstream of the detection hole 160a in the conveyance direction. In other words, at S2202, first the optical sensor 50 is moved in the backward direction to the center of the detection hole 160a in the scanning direction. Then, the tray 12 is conveyed in the returning direction to position the optical sensor 50 at the position R7 (see the arrows I and II in FIG. 23A).

Next, it is determined by detection whether the card Cd is present at the first fitting portion 160 (S2204). At this S2204, whether the card Cd is present at the first fitting portion 160 is determined by whether the optical sensor 50 was able to detect the detection hole 160a of the first fitting portion 160. Specifically, in the case where a card Cd is set in the first fitting portion 160, the detection hole 160a is covered by the card Cd and thus cannot be detected by the optical sensor 50. On the other hand, in the case where a card Cd is not set in the first fitting portion 160, the detection hole 160a is exposed and thus can be detected by the optical sensor 50. In summary, at S2204, if the detection hole 160a is detected, it is determined that there is no card Cd, and if the detection hole 160a is not detected, it is determined that there is a card Cd.

Note that in detecting the detection hole 160a, since the card mount CM has a higher light reflectance than the tray 12 (recess 150), the output value of the optical sensor 50 increases when the detection point of the optical sensor 50 enters the detection hole 160a from the card mount CM. At this time, when the output value becomes more than or equal to a specified threshold, it is determined that the edge of the detection hole 160a, in other words, the detection hole 160a has been detected. In the case where a card is set on the card mount CM, since no large change in the light reflectance occurs on the surface of the card, the output value of the optical sensor 50 will not become more than or equal to the specified threshold. Thus, it is determined that the detection hole 160a was not detected.

Thus, at S2204, first the tray 12 is conveyed in the returning direction to position the optical sensor 50 at the center of the detection hole 160a (see the arrow III in FIG. 23A). After that, it is determined whether the detection hole 160a was detected during the movement from the position R7 to the detection hole 160a.

Next, it is determined by detection whether there is a card Cd at the second fitting portion 162 (S2206). The method of determining whether there is a card Cd and the method of detecting the detection hole at S2206 are the same. Specifically, at S2206, first, the optical sensor 50 is moved in the forward direction to position the optical sensor 50 at the center of the detection hole 162a (see the arrow IV in FIG. 23A). Then, it is determined whether the detection hole 162a was detected during the movement from the detection hole 160a to the detection hole 162a.

After that, it is determined whether the card Cd set in each fitting portion agrees with the print conditions (S2208). In other words, it is determined at S2208 whether the detection results at S2204 and S2206 agree with the print conditions. For example, in the case where the print conditions concern printing on two cards Cd, if a card Cd was detected at each of S2204 and S2206, it is determined that the detection results agree with the print conditions. If a card Cd was not detected in at least one of S2204 and S2206, it is determined that the detection results do not agree with the print conditions. In the case where the print conditions concern printing on a card Cd set in the first fitting portion 160, if a card Cd was detected only at S2204, it is determined that the detection results agree with the print conditions, and in the other cases, it is determined that the detection results do not agree with the print conditions. Further, in the case where the print conditions concern printing on a card Cd set in the second fitting portion 162, if a card Cd was detected only at S2206, it is determined that the detection results agree with the print conditions, and in the other cases, it is determined that the detection results do not agree with the print conditions.

If it is determined at S2208 that the detection results agree with the print conditions, the process proceeds to S2104. If it is determined at S2208 that the detection results do not agree with the print conditions, it is determined that cards are not properly set on the card mount CM, and the tray 12 is discharged (S2210). After that, an error message indicating that the tray 12 is not properly set is shown to the user via the display 124 or the like (S2212), the card detection process and also the third process end, which finishes the printing process.

Figure 23B:
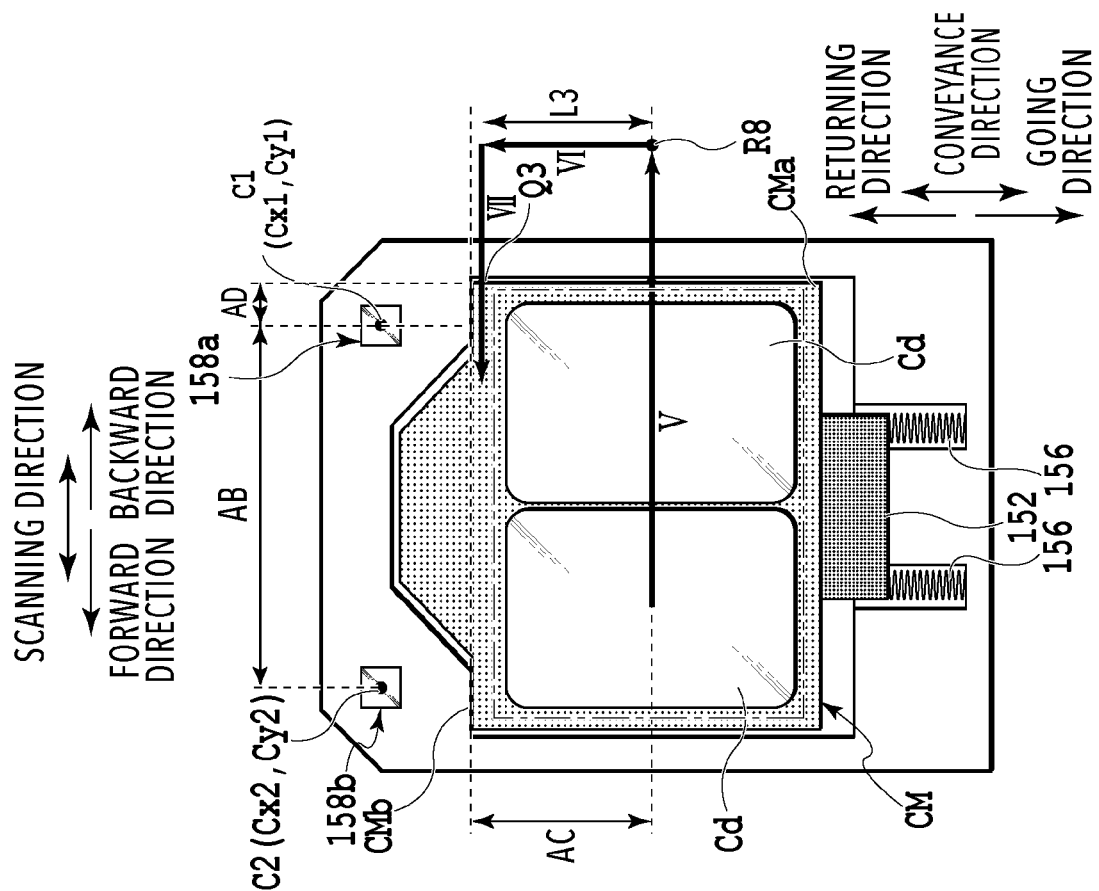
FIGS. 23A and 23B are diagrams for explaining a process of obtaining positional information of a card mount.
Figure 23A:
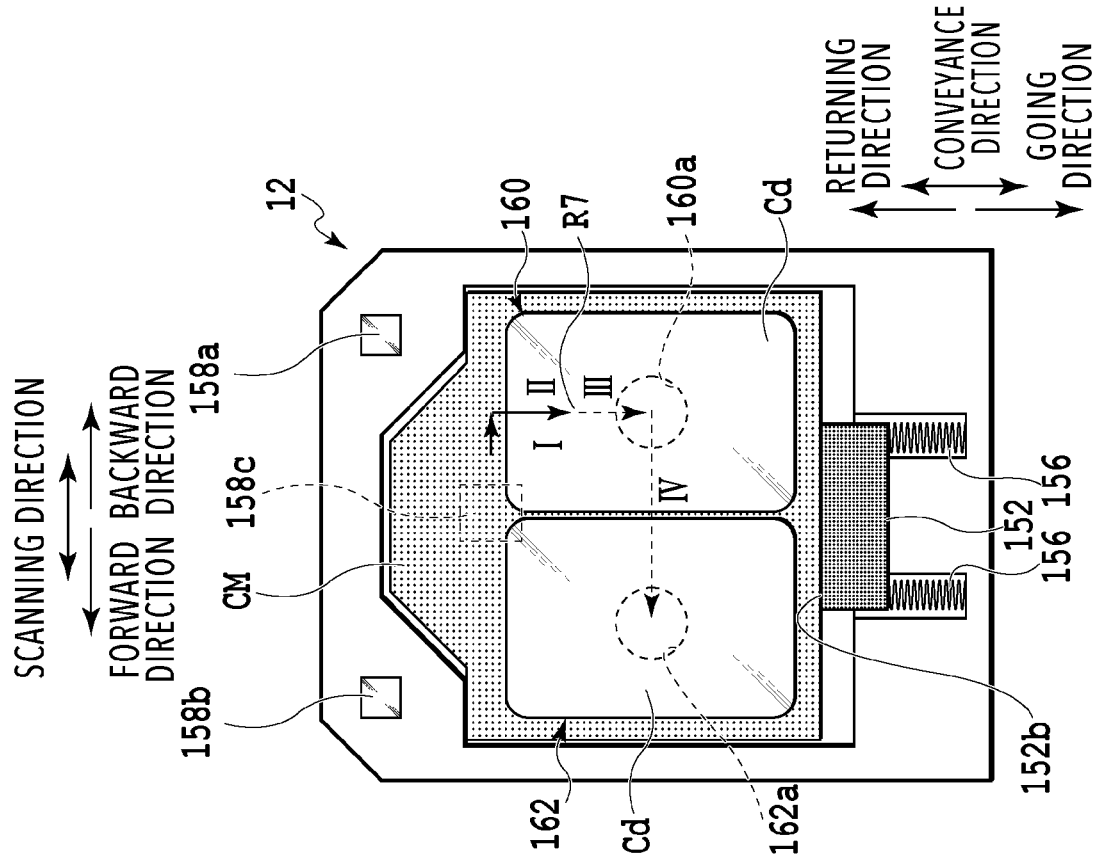
Figure 24:
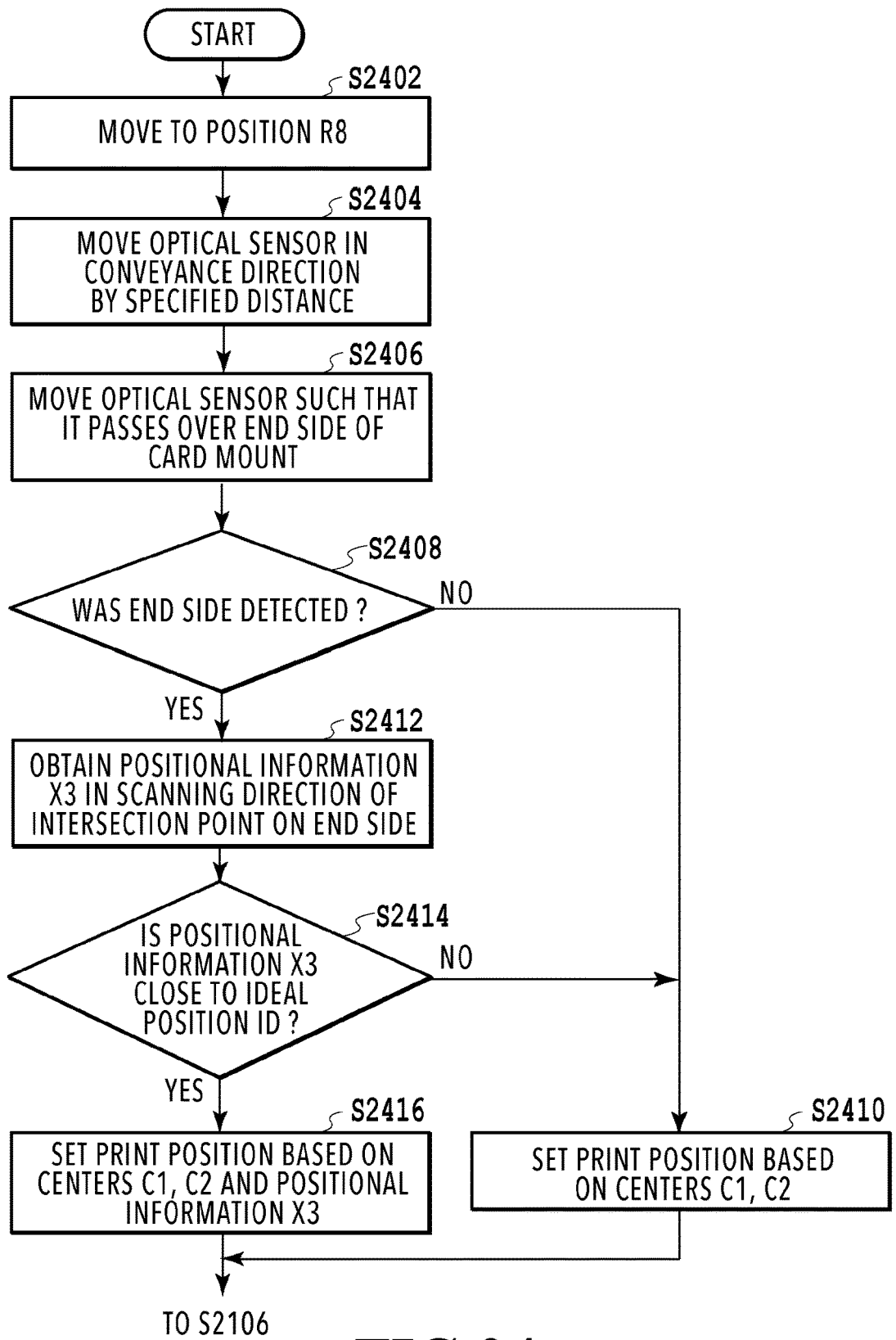
FIG. 24 is a flowchart illustrating the process routine of a second setting process.

FIG. 23B is a diagram for explaining the second setting process, and FIG. 24 is a flowchart illustrating the process routine of the second setting process which is a subroutine of the third process. In this second setting process, the positions of the cards Cd are obtained via the card mount CM, and the print positions are set based on the obtained information. In the second setting process at S2104, first the optical sensor 50 is positioned at the position R8 (S2402). In other words, at S2402, the optical sensor 50 is moved in the backward direction (see the arrow V in FIG. 23B) to the position R8. The position R8 is located approximately at the center of the cards Cd in the conveyance direction, and is a position a certain distance away from the card mount CM held on the tray 12 on the other side in the scanning direction.

Next, the optical sensor 50 is moved in the conveyance direction by a specified distance (S2404). Specifically, at S2404, the tray 12 is conveyed in the going direction by the specified distance to move the optical sensor 50 relative to the tray 12 in the conveyance direction by the specified distance (see the arrow VI in FIG. 23B). The specified distance is shorter by a specified length in the conveyance direction than the length L3 from the center of the cards Cd (the detection holes 160a and 162a) to the end side CMb positioned on the upstream side in the conveyance direction of the rectangular portion of the card mount CM. This specified length is set, for example, based on a maximum value of the skewing angle of the tray 12 at the time when the tray 12 is conveyed in a printable manner.

After that, the optical sensor 50 is moved in the forward direction (see the arrow VII in FIG. 23B) so that the optical sensor 50 passes over the end side CMa of the card mount CM held by the tray 12, extending in the conveyance direction (S2406). The surface of the card mount CM has a higher reflectance than that of the tray 12. Accordingly, when the optical sensor 50 passes the end side CMa, the output value of the optical sensor 50 changes largely.

Then, it is determined whether the end side CMa of the card mount CM was detected (S2408). In other words, it is determined at S2408 whether the output value of the optical sensor 50 crossed a set threshold. In the case where the output value of the optical sensor 50 crossed the threshold, it is determined that the end side CMa was detected, and in the case where the output value of the optical sensor 50 did not cross the threshold, it is determined that the end side CMa was not detected. If it is determined at S2408 that the end side CMa was not detected, the print position is set based on the center C1 of the first reflecting portion 158a and the center C2 of the second reflecting portion 158b (S2410). After that, the process proceeds to S2106.

If it is determined at S2408 that the end side CMa was detected, the positional information X3 in the scanning direction on the intersection point Q3 of the end side CMa and the movement path of the optical sensor 50 is obtained (2412). Then, it is determined whether the obtained positional information X3 is close to an ideal position ID (S2414). In other words, at S2414, it is determined whether the difference between the positional information X3 and the ideal position ID is more than or equal to a fourth setting value. Here, the controller 100 stores an ideal distance AD in the scanning direction from the center of the first reflecting portion 158a to the intersection point Q3. The ideal position ID is calculated by subtracting the ideal distance AD from the positional information Cx1 on the center of the first reflecting portion 158a in the scanning direction, obtained in the first obtaining process. Thus, at S2414, it is determined whether $|X3 - (Cx1 - AD)|$ is the fourth setting value or more. In the case where $|X3 - (Cx1 - AD)|$ is the fourth setting value or more, it is determined that the positional information X3 and the ideal position ID are not close. In the case where $|X3 - (Cx1 - AD)|$ is less than the fourth setting value, it is determined that the positional information X3 and the ideal position ID are close.

If it is determined at S2414 that the positional information X3 and the ideal position ID are not close, it is determined that the positional information X3 was not accurately detected, the process proceeds to S2410, where the print position is set based on the center C1 and the center C2. After that, the process proceeds to S2106. If it is determined at S2414 that the positional information X3 and the ideal position ID are close, it is determined that the positional information X3 was accurately detected, and the print position is set based on the center C1 of the first reflecting portion 158a, the center C2 of the second reflecting portion 158b, and the positional information X3 (S2416). After that, the process proceeds to S2106.

Specifically, at S2416, a set print position is changed, which is set in advance based on a positional error amount Z1 and a skew error amount Z2 in the scanning direction calculated from the center C1 of the first reflecting portion 158a, the center C2 of the second reflecting portion 158b, the positional information X3, and the like. The skew error amount Z2 is an error amount in the scanning direction caused by the tray 12 skewing while being conveyed. The set print position is, for example, a print position in a case where the tray 12 is conveyed without skewing with respect to the conveyance direction in a state where the card mount CM is held at a specified position in the recess 150. Note that the specified position is the position that makes the distance in the scanning direction from the intersection point Q3 to the center of the first reflecting portion 158a equal to the ideal distance AD. In other words, the specified position is the position that satisfies $(X3 - Cx1) = AD$.

The positional error amount Z in the scanning direction is calculated based on the positional information X3 and the ideal position ID (calculated from the positional information Cx1 and the ideal distance AD). Specifically, the positional error amount Z1 in the scanning direction is expressed by the following formula:

$$Z=X3-(Cx1-AD).$$

The skew error amount Z2 in the scanning direction is calculated based on the center C1, the center C2, and the distance AC from the center of the cards Cd to the intersection point Q3 in the conveyance direction. In other words, the skew error amount Z2 in the scanning direction is expressed by the following formula:

$$Z2=AC\times(Cy2-Cy1)/AB,$$

where AB is the distance between the centers C1 and C2 in the scanning direction (AB=Cx2 −Cx1).

Note that for the conveyance direction, the set print position is changed based on the center C1 of the first reflecting portion 158a and the center C2 of the second reflecting portion 158b.

As has been described above, the printing apparatus 10 has a configuration capable of printing on the three types of print media—optical disks D, cards Cd, and nail stickers Ns—and the print position is set differently depending on the type of print media. Specifically, for optical disks D for which the permissible range of a positional error in printing is small, the information on the center position of the hole DH of the optical disk D is obtained, and the print position is set using this information as the center of the optical disk D. With this operation, the center of the optical disk D thus obtained does not have errors resulting from factors such as the dimensional tolerance of the tray and the outer diameter tolerance of the optical disk, making it possible to set a print position with a less possibility of causing a positional error in printing.

For cards Cd for which the permissible range of a positional error in printing is small in the scanning direction, the information on the position in the scanning direction of the card mount CM on which cards Cd are set is obtained, and the positional error amount in the scanning direction is reflected on the print position using this information. For cards Cd, since the card mount CM has a large permissible range of a positional error in printing in the conveyance direction, the print position in the conveyance direction is set based on the information on the center C1 of the first reflecting portion 158a and the center C2 of the second reflecting portion 158b.

Further, for nail stickers Ns which have a relatively large permissible range of a positional error in printing in both the scanning direction and the conveyance direction, the print position is set based on the information on the positions of the center C1 of the first reflecting portion 158a and the center of the second reflecting portion 158b.

In summary, in the case where an optical disk D is held by the tray 12, the positional information on the center of the optical disk D in the conveyance direction and in the scanning direction is obtained. In the case where a card mount CM on which cards Cd are placed is held by the tray 12, the position of the cards Cd in the conveyance direction is obtained based on the positions of the reflecting portions 158 of the tray 12, and the positions of the cards Cd in the scanning direction is obtained based on the position of the card mount CM in the scanning direction. This is because the permissible range of a positional error in printing is large in the conveyance direction because the card mount CM is positioned by the tray 12. It is also because the permissible range of a positional error in printing is small in the scanning direction because the card mount CM is not positioned by the tray 12. Lastly, in the case where a nail-sticker mount NM on which nail stickers Ns are placed is held by the tray 12, the positions of the nail stickers Ns in the conveyance direction and in the scanning direction are obtained based on the positions of the reflecting portions 158 of the tray 12.

As has been described above, since a different process is performed to obtain the positional information to set the print position depending on the permissible range of a positional error in printing based on the type of print medium, the time taken to obtain the positional information is shorter, which makes the time taken for the printing process shorter and makes the decrease in throughput less likely.

Other Embodiments

Note that the above embodiment can be modified as shown in the following (1) to (9).

(1) Although in the processes at S1314 and S1322 in the setting process in the above embodiment, the accuracy in detecting the edges of the hole DH is checked using the first positional information DCx and the second positional information DCx2, the present invention is not limited to this method. Specifically, to check the accuracy in detecting the edges of the hole DH, for example, the optical sensor 50 may perform two cycles of forward-backward movement over the hole DH, and the center of the hole DH obtained from the edges detected in one cycle of forward-backward movement may be compared to that obtained in the other cycle. Note that in the case where the optical sensor 50 performs forward-backward movement, the optical sensor may be shifted by a specified distance in the direction orthogonal to the moving direction of the optical sensor. In addition, the moving direction of the optical sensor 50 may be either the scanning direction or the conveyance direction. Further, in this case, the positions of the detected edges may be used in any manner to calculate the center of the hole DH from the edges detected in one cycle of the forward-backward movement. Note that in this case, the center of the hole DH obtained based on the edges detected in the first cycle of the forward-backward movement and the center of the hole DH obtained based on the second cycle of the forward-backward movement are calculated using the same calculation method.

(2) Although in the first obtaining process and the second obtaining process in the above embodiment, the positional information on the edges detected when the detection point of the optical sensor 50 enters the reflecting portions 158 is used to obtain the centers C1 and C2 of the reflecting portions 158, the present invention is not limited to this method. Specifically, the positional information on the edges detected when the detection point of the optical sensor 50 gets out of the reflecting portions 158 may be used to obtain the centers of the reflecting portions 158. Although in the above embodiment, the two reflecting portions, the first reflecting portion 158a and the second reflecting portion 158b, are arranged outside the recess 150 of the tray 12, the present invention is not limited to this arrangement. To be more specific, one reflecting portion or three or more reflecting portions may be arranged outside the recess 150 of the tray 12.

(3) Although in the third obtaining process and the fourth obtaining process in the above embodiment, the positional information on the edges detected when the detection point of the optical sensor 50 gets out of the hole DH is used to obtain the center of the hole DH, the present invention is not limited to this method. In other words, the positional information on the edges detected when the detection point of the optical sensor 50 enters the hole DH may be used to obtain the center of the hole DH (the center C4 of the optical disk D). Although in the above embodiment, for print media held by the tray 12 besides optical disks D, and cards Cd, nail stickers Ns has been described as an example, anything that can be held by the tray 12 and on which printing can be performed may be used as a print medium. Note that for print media other than optical disks D and cards Cd, the second process will be executed.

(4) Although in the above embodiment, the printing method of the printing apparatus 10 is an inkjet method, the present invention is not limited to this method, but printing can be performed by other printing methods. In addition, although in the above embodiment, the optical sensor 50 is moved in the scanning direction via the carriage 32, and the optical disk D is moved in the conveyance direction via the tray 12, the present invention is not limited to this configuration. Specifically, the printing apparatus 10 may be configured such that one of the optical sensor 50 and the optical disk D may move both in the scanning direction and in the conveyance direction relative to the other. In other words, the printing apparatus 10 may have any configuration in which the relative positional relationship in the scanning direction and in the conveyance direction between the optical sensor 50 and the optical disk D can be changed.

(5) In the above embodiment, to obtain the center of the hole DH in the conveyance direction, the edges of the hole DH in the conveyance direction are obtained by moving the optical sensor 50 forward and backward in the conveyance direction. Also, to obtain the center of the hole DH in the scanning direction, the edges of the hole DH in the scanning direction are obtained by moving the optical sensor 50 forward and backward in the scanning direction. However, the process to obtain the center of the hole DH is not limited to the above process. In other words, to obtain the center of the hole in the conveyance direction, the edges of the hole DH in the conveyance direction may be obtained by moving the optical sensor 50 in one of the going direction and the returning direction of the conveyance direction, and the center may be obtained based on the edges thus obtained. Similarly, to obtain the center of the hole in the scanning direction, the edges of the hole DH in the scanning direction may be obtained by moving the optical sensor 50 in one of the forward direction and the backward direction of the scanning direction, and the center may be obtained based on the edges thus obtained.

(6) Although in the above embodiment to obtain the center of the hole DH, the center in the conveyance direction is obtained, and then the center in the scanning direction is obtained, the present invention not limited to this operation. In other words, the center in the scanning direction may be obtained before the center in the conveyance direction is obtained. Although in the above embodiment, three types of print medium are used, and the print position is obtained based on the positional information with accuracy according to the type of print medium, the present invention is not limited to this operation. Specifically, the number of types of print media may be two or four or more. In addition, the process for obtaining the print position for each print medium is not limited to the process described in the above embodiment, but the print position may be obtained using various known techniques.

(7) Although in the above embodiment, cards Cd are set side by side in the scanning direction on a card mount CM, the present invention is not limited to this arrangement. In other words, cards Cd may be set side by side in the conveyance direction on a card mount CM. In this case, the space between fitting portions in which cards Cd are set is small in the conveyance direction. Accordingly, the permissible range of a positional error in printing in the conveyance direction is set small, and the permissible range of a positional error in printing in the scanning direction is set large. In this case, the optical sensor 50 detects the end side CMb in the conveyance direction of the rectangular shape of the card mount CM (see FIG. 23B). Then, the optical sensor 50 is moved in the conveyance direction to obtain the positional information in the conveyance direction of the intersection point of the movement path of the optical sensor 50 and the end side CMb, and the positional error amount in the conveyance direction and the positional error amount in the scanning direction are calculated to set the print position.

Figure 25A:
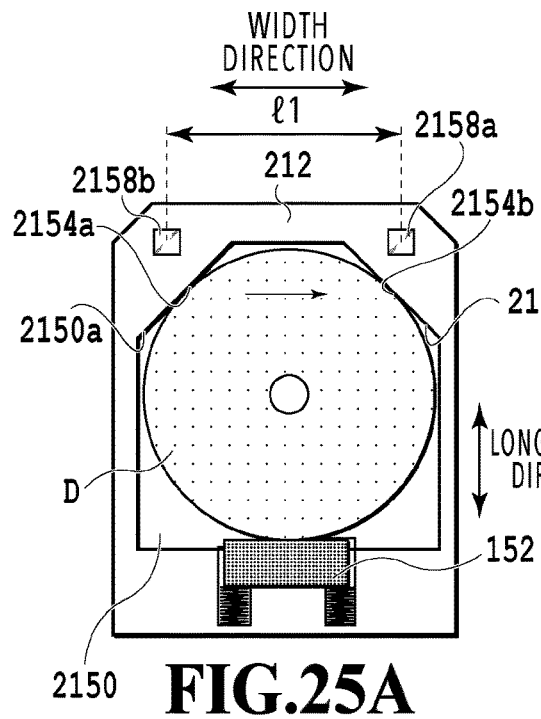
FIGS. 25A, 25B, 25C, and 25D are diagrams illustrating modifications of the tray.
Figure 25B:
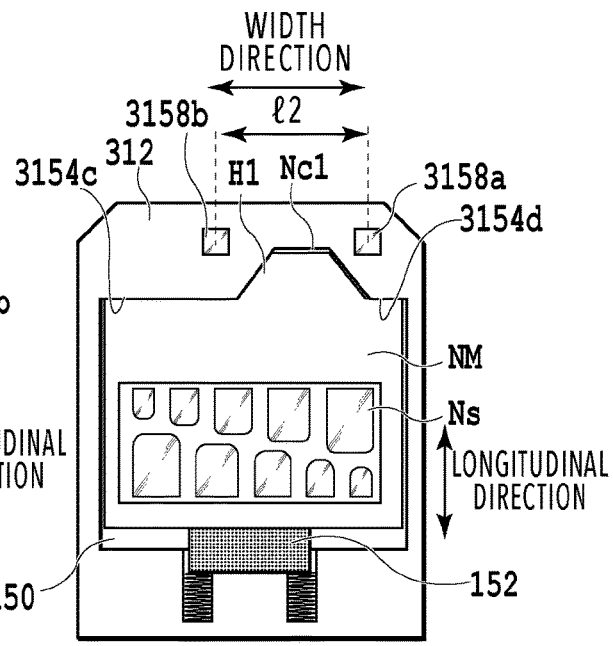
Figure 25C:
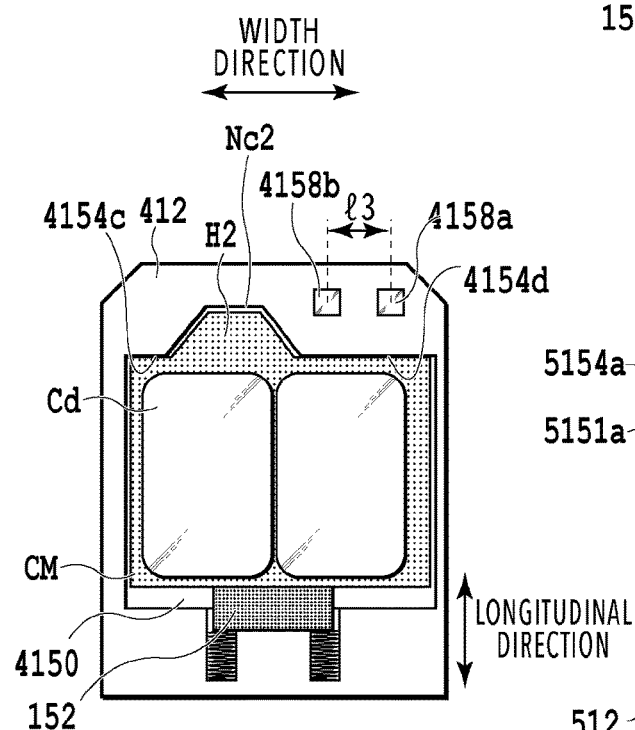

(8) Although in the above embodiment, the tray 12 is configured to be capable of holding three types of print media, the present invention is not limited to this configuration. Specifically, different trays may be used for different types of print media. The details will be described below. FIG. 25A is a plan view of a tray 212 holding an optical disk D. FIG. 25B is a plan view of a tray 312 holding a nail-sticker mount NM. FIG. 25C is a plan view of a tray 412 holding a card mount CM. Note that in the following description, constituents having the same or equivalent configurations as those in the tray 12 will be denoted by the same symbols, and detailed description thereof will be omitted as appropriate.

The tray 212 has oblique sides 2150$a$ and 2150$b$ formed on one side of a recess 2150 in the longitudinal direction of the tray 212, and the oblique sides 2150$a$ and 2150$b$ have abutment portions 2154$a$ and 2154$b$ with which the outer circumference of the optical disk D can be brought into contact. The optical disk D is held in the recess 2150 being pressed against this abutment portions 2154$a$ and 2154$b$ by the pressing member 152.

The tray 312 has abutment portions 3154$c$ and 3154$d$ formed on one side of a recess 3150 in the longitudinal direction of the tray 312, and a nail-sticker mount NM is held in the recess 3150 being pressed against the abutment portions 3154$c$ and 3154$d$ by the pressing member 152. On one side of the recess 3150 in the longitudinal direction of the tray 312 is formed a cut-in portion Nc1. The cut-in portion Nc1 is shifted to the other side (the right side in the figure) relative to the center in the width direction of the tray 312. The nail-sticker mount NM has a protrusion H1 adapted to fit into the cut-in portion Nc1 in the situation that the nail-sticker mount NM is held in the recess 3150.

The tray 412 has abutment portions 4154$c$ and 4154$d$ formed on one side of a recess 4150 in the longitudinal direction of the tray 412, and a card mount CM is held in the recess 4150 being pressed against the abutment portions 4154$c$ and 4154$d$ by the pressing member 152. On one side of the recess 4150 in the longitudinal direction of the tray 412 is formed a cut-in portion Nc2. The cut-in portion Nc2 is shifted to the one side (the left side in the figure) relative to the center in the width direction of the tray 412. The card mount CM has a protrusion H2 adapted to fit into the cut-in portion Nc2 in the situation that the card mount CM is held in the recess 4150.

For the trays 312 and 412, the length of each of the recess 3150 and 4150 in the longitudinal direction excluding the cut-in portion Nc1 or Nc2 is shorter than the diameter of the optical disk D. Thus, the recesses 3150 and 4150 cannot hold an optical disk D. For the tray 212, the portions of the nail-sticker mount NM and the card mount CM adapted to come into contact with the abutment portions interfere with the oblique sides 2150$a$ and 2150$b$, and thus the tray 212 cannot hold the nail-sticker mount NM and the card mount CM in the recess 2150. Further, the cut-in portion Nc1 of the tray 312 and the protrusion H2 of the card mount CM are located at positions where these are overlapped with each other in the width direction, and thus the tray 312 cannot hold the card mount CM. In addition, the cut-in portion Nc2 of the tray 412 and the protrusion H1 of the nail-sticker mount NM are located at different positions in the width direction, and thus, the tray 412 cannot hold the nail-sticker mount NM. As just described, each tray is configured to be not capable of holding print media other than the type that the tray supports.

The trays 212, 312, and 412 have first reflecting portions 2158a, 3158a, and 4158a, respectively, at the same position in the longitudinal direction and in the width direction. The tray 212 has a second reflecting portion 2158b at the position that is the same position in the longitudinal direction as the first reflecting portion 2158a and is a first distance l1 away from the first reflecting portion 2158a. The tray 312 has a second reflecting portion 3158b at the position that is the same position in the longitudinal direction as the first reflecting portion 3158a and is a second distance l2 away from the first reflecting portion 3158a. The tray 412 has a second reflecting portion 4158b at the position that is the same position in the longitudinal direction as the first reflecting portion 4158a and is a third distance l3 away from the first reflecting portion 4158a. Note that the relationship between the first distance l1, the second distance l2, and the third distance l3 is l1>l2>l3.

Thus, in the case of using the tray 212, 312, or 412, the optical sensor 50 detects the second reflecting portion 2158b, 3158b, or 4158b at a different detecting position. For this reason, the type of print medium can be identified based on the positions of the second reflecting portions 2158b, 3158b, and 4158b, and thus the user does not need to input information concerning the type of print medium. Note that regarding a reflecting portion for determining whether the tray is holding a print medium (corresponding to the third reflecting portion 158c in the above embodiment), the tray 212 has a reflecting portion for this purpose at a position inside the recess 2150 and not exposed from the hole DH of the optical disk D. For the tray 312, a reflecting portion for this purpose can be at any position in the recess 3150. For the tray 412, a reflecting portion for this purpose should be at a position inside the recess 4150 and not exposed from the detection holes 160a and 162a of the card mount CM.

Figure 25D:
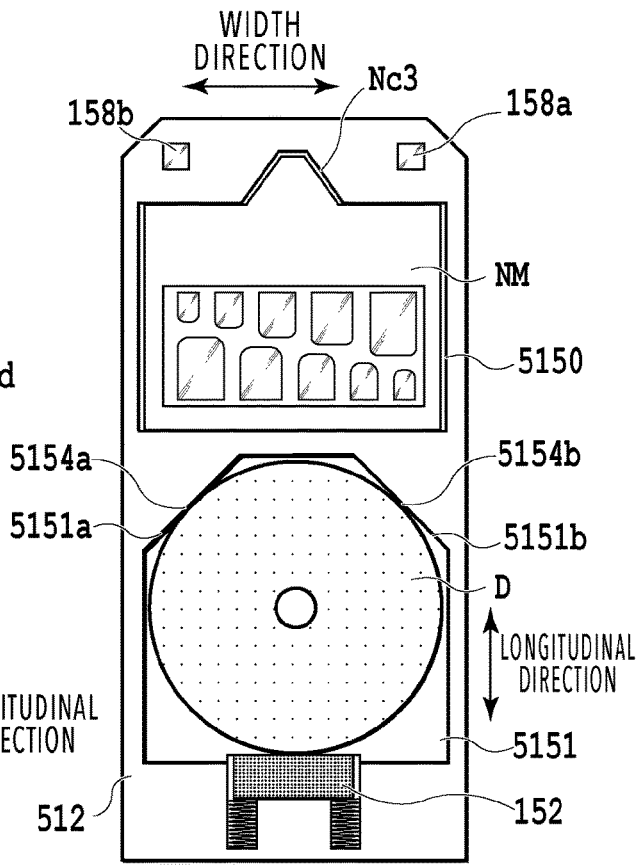

(9) Although in the above embodiment, the tray 12 holds one print medium, the present invention is not limited to this configuration. In other words, the tray 12 may have a configuration capable of holding multiple print media at the same time. The details will be described below. FIG. 25D is a plan view of a tray 512 capable of holding an optical disk D and a nail-sticker mount NM at the same time. Note that in the following description, constituents having the same or equivalent configurations as those in the tray 12 will be denoted by the same symbols, and detailed description thereof will be omitted as appropriate.

The tray 512 includes a first recess 5150 for holding a nail-sticker mount NM and a second recess 5151 for holding an optical disk D. The first recess 5150 has a shape into which the nail-sticker mount NM can fit and that is capable of holding the fitted nail-sticker mount NM. Specifically, since the first recess 5150 holds the nail-sticker mount NM having nail stickers Ns for which the permissible range of a positional error in printing is relatively large, the first recess 5150 does not have a configuration in which a pressing member presses the nail-sticker mount to fix it. This configuration contributes to the reduction in the part count of the tray 512, leading to cost saving. Note that the tray 512 may have a configuration in which the pressing member 152 presses the nail-sticker mount NM as in the tray 12 or tray 312 described above. The second recess 5151 includes oblique sides 5151a and 5151b formed in the one side part of the tray 512 in the longitudinal direction, and the oblique sides 5151a and 5151b have abutment portions 5154a and 5154b with which the outer circumference of the optical disk D can be brought into contact. The optical disk D is held in the recess 5151 being pressed against the abutment portions 5154a and 5154b by the pressing member 152.

The length of the first recess 5150 in the longitudinal direction excluding a cut-in portion Nc3 is shorter than the diameter of the optical disk D. Thus, the recess 5150 cannot hold an optical disk D. In addition, the second recess 5151 cannot hold a nail-sticker mount NM because the outer shape of the nail-sticker mount NM would interfere with the outer shape of the second recess 5151. Thus, the first recess 5150 and the second recess 5151 are configured not to be able to hold print media other than the type that each recess supports.

In this case, at S620 in the printing process, the third reflecting portion (not illustrated) of the first recess 5150 and also the third reflecting portion (not illustrated) of the second recess 5151 are detected. Then, if it is determined at S622 that only the third reflecting portion of the first recess 5150 was detected, the first process is executed. If it is determined at S622 that only the third reflecting portion of the second recess 5151 was detected, the second process is executed. If it is determined at S622 that the third reflecting portions of both the first recess 5150 and the second recess 5151 were detected, the process proceeds to S624. If it is determined at S622 that the third reflecting portion of neither the first recess 5150 nor the second recess 5151 was detected, the second process is executed, and then the first process is executed.

Note that the tray 512 may be configured to be capable of holding a card mount CM in the first recess 5150. Alternatively, the tray 512 may be configured such that at least one of the first recess 5150 and the second recess 5151 is capable of selectively holding an optical disk D, a card mount, and a nail-sticker mount NM, as in the tray 12. Alternatively, the tray 512 may be configured to have multiple recesses to be capable of holding three types of print media at the same time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-145064 filed Aug. 1, 2018, which is hereby incorporated by reference wherein in its entirety.

What is claimed is:

1. A printing apparatus comprising:
   a print unit configured to perform printing on a print medium held by a holding unit, the holding unit being capable of holding multiple types of print medium;
   a detecting unit capable of detecting the print medium and the holding unit;
   a movement unit capable of relatively moving the detecting unit and the holding unit in a first direction and in a second direction intersecting the first direction; and
   a control unit configured to control the detecting unit and the movement unit, in a case where a first print medium is held by the holding unit and the print unit performs printing on the held first print medium, to obtain position information of the first print medium before the print unit performs printing and configured not to obtain position information of a second print medium different from the first print medium with use of the detecting unit, in a case where the second print medium is held by the holding unit and the print unit performs printing on the held second print medium.

2. The printing apparatus according to claim 1, wherein the movement unit includes a carriage mounted with the detecting unit and configured to move in the first direction and a conveying unit configured to convey the holding unit in the second direction.

3. The printing apparatus according to claim 2, wherein the print unit is mounted on the carriage.

4. The printing apparatus according to claim 2, wherein, in a case where the first print medium is held by the holding unit, the control unit obtains the position information of the first print medium by moving the detecting unit in the first direction by means of the carriage and moving the holding unit holding the first print medium in the second direction by means of the conveying unit to detect a first position of the first print medium in the first direction and a second position of the first print medium in the second direction.

5. The printing apparatus according to claim 1, wherein the first print medium is an optical disk, and
wherein the control unit obtains position information of a hole of the optical disk.

6. The printing apparatus according to claim 2, wherein the holding unit includes a detection portion, and
wherein the control unit moves the detecting unit in the first direction by means of the carriage and moves the holding unit holding the print medium in the second direction by means of the conveying unit to detect a first position of the detection portion in the first direction and a second position of the detection portion in the second direction.

7. The printing apparatus according to claim 1, wherein the second print medium is a mount with a nail sticker.

8. The printing apparatus according to claim 1, wherein the holding unit is capable of selectively holding a print medium of multiple types on a placement portion.

9. The printing apparatus according to claim 1, wherein the holding unit has a pressing member configured to press the print medium and an abutment portion with which the print medium pressed by the pressing member is brought into contact.

10. The printing apparatus according to claim 9, wherein the abutment portion of the holding unit includes different abutment portions each corresponding to a type of print medium.

11. The printing apparatus according to claim 1, wherein the holding unit has a first placement portion capable of holding the first print medium and a second placement portion capable of holding the second print medium.

12. A printing method of performing printing on a print medium using a printing apparatus including
a print unit configured to perform printing on a print medium held by a holding unit, the holding unit being capable of holding multiple types of print medium, and
a detecting unit capable of detecting the print medium and the holding unit by relatively moving the holding unit in a first direction and in a second direction intersecting the first direction, the printing method comprising:
controlling the detecting unit, in a case where a first print medium is held by the holding unit and the print unit performs printing on the held first print medium, to obtain position information of the first print medium before the print unit performs printing, and
controlling the detecting unit, in a case where a second print medium different from the first print medium is held by the holding unit and the print unit performs printing on the held second print medium, not to obtain position information of the second print medium.

13. The printing apparatus according to claim 1, wherein the control unit controls the detecting unit and the movement unit, in a case where the first print medium is held by the holding unit and the print unit performs printing on the first print medium, to obtain the position information of the first print medium before the print unit performs printing and to obtain position information of the holding unit and, in a case where the second print medium different from the first print medium is held by the holding unit and the print unit performs printing on the second print medium, not to obtain the position information of the second print medium and to obtain the position information of the holding unit.

14. The printing apparatus according to claim 1, further including a carriage mounted with the detecting unit and configured to move in the first direction, and a conveying unit configured to cover the holding unit in the second direction.

15. The printing method according to claim 14, wherein in a case where the first print medium is held by the holding unit, the position information of the first print medium is obtained by moving the detecting unit in the first direction by means of the carriage and moving the holding unit holding the first print medium in the second direction by means of the conveying unit to detect a first position of the first print medium in the first direction and a second position of the first print medium in the second direction.

16. The printing method according to claim 12, wherein the detecting unit is controlled, in a case where the first print medium is held by the holding unit and the print unit performs printing on the first print medium, to obtain the position information of the first print medium before the print unit performs printing and to obtain position information of the holding unit, and
the detecting unit is controlled, in a case where the second print medium different from the first print medium is held by the holding unit and the print unit performs printing on the second print medium, not to obtain the position information of the second print medium and to obtain the position information of the holding unit.

* * * * *